(12) United States Patent
Grassia et al.

(10) Patent No.: US 11,751,717 B2
(45) Date of Patent: Sep. 12, 2023

(54) APPARATUS AND METHOD FOR FROTHING MILK

(71) Applicant: BREVILLE PTY LIMITED, Alexandria (AU)

(72) Inventors: Robert Grassia, Summer Hill (AU); Nicholas McColl, Randwick (AU); Daniel Robert Corkin, Panania (AU)

(*) Notice: Subject to any disclaimer, the term of this patent is extended or adjusted under 35 U.S.C. 154(b) by 521 days.

(21) Appl. No.: 16/739,043

(22) Filed: Jan. 9, 2020

(65) Prior Publication Data
US 2020/0138234 A1    May 7, 2020

Related U.S. Application Data

(63) Continuation of application No. 15/025,890, filed as application No. PCT/AU2014/000947 on Sep. 30, 2014, now abandoned.

(30) Foreign Application Priority Data

| Sep. 30, 2013 | (AU) | ................................ 2013903770 |
| Feb. 28, 2014 | (AU) | ................................ 2014900665 |
| Aug. 7, 2014 | (AU) | ................................ 2014903059 |

(51) Int. Cl.
  *A47J 31/44* (2006.01)
(52) U.S. Cl.
  CPC .................................. *A47J 31/4489* (2013.01)
(58) Field of Classification Search
  CPC .............................. A47J 31/4489; A47J 31/00
(Continued)

(56) References Cited

U.S. PATENT DOCUMENTS

| 3,157,190 A | 11/1964 | Allen |
| 4,419,301 A | 12/1983 | Nahra et al. |

(Continued)

FOREIGN PATENT DOCUMENTS

| CN | 1558734 A | 12/2004 |
| CN | 1835701 A | 9/2006 |

(Continued)

OTHER PUBLICATIONS

Office Action issued in Chinese Patent Application No. 201480064422.3, dated Mar. 1, 2018.
(Continued)

*Primary Examiner* — Dana Ross
*Assistant Examiner* — Joseph W Iskra
(74) *Attorney, Agent, or Firm* — Quarles & Brady LLP

(57) ABSTRACT

A jug for use with a frothing apparatus. The jug comprising: a vessel body for holding a liquid to be heated; a handle attached to the vessel body, the handle for holding the jug; a user interface for receiving an operation-related user input; a communication means adapted to communicate data associated with the jug to the frothing apparatus; and a controller for controlling the user interface and the communication means. In an embodiment, The frothing apparatus comprises: a steam heater, a steam nozzle, and a steam path providing fluid communication from the steam heater to the steam nozzle for delivering heating steam to the jug; communication means adapted to receive operating data from a cooperating communication means associated with the jug, the data comprising an operation-related user input; and a controller for controlling operation of the steam heater and the steam path based on the operation-related user input.

16 Claims, 27 Drawing Sheets

(58) Field of Classification Search
USPC .................................................... 99/323.1
See application file for complete search history.

(56) References Cited

U.S. PATENT DOCUMENTS

| | | | |
|---|---|---|---|
| 5,551,331 | A | 9/1996 | Pfeifer et al. |
| 5,992,650 | A | 11/1999 | Lord |
| 8,826,802 | B2 | 9/2014 | Quaratesi |
| 2004/0170727 | A1 | 9/2004 | Howard et al. |
| 2004/0255789 | A1 | 12/2004 | Fischer |
| 2005/0005780 | A1 | 1/2005 | Beretta |
| 2007/0169632 | A1 | 7/2007 | Beesley et al. |
| 2009/0000488 | A1 | 1/2009 | Magg et al. |
| 2009/0007802 | A1 | 1/2009 | Taitler |
| 2009/0301310 | A1 | 12/2009 | Bazin et al. |
| 2012/0000372 | A1 | 1/2012 | Vanni et al. |
| 2012/0137892 | A1 | 6/2012 | Dollner et al. |
| 2012/0240774 | A1 | 9/2012 | Yang |
| 2013/0064941 | A1 | 3/2013 | Taitler |
| 2014/0069279 | A1* | 3/2014 | Upston .................. A47J 31/44 99/283 |

FOREIGN PATENT DOCUMENTS

| | | |
|---|---|---|
| CN | 101056562 A | 10/2007 |
| CN | 101242762 A | 8/2008 |
| CN | 101380201 A | 3/2009 |
| CN | 201332961 Y | 10/2009 |
| CN | 101947061 A | 1/2011 |
| CN | 201734533 U | 2/2011 |
| CN | 102160757 A | 8/2011 |
| CN | 102334911 A | 2/2012 |
| CN | 102389265 A | 3/2012 |
| CN | 102595984 A | 7/2012 |
| CN | 102612334 A | 7/2012 |
| CN | 102753065 A | 10/2012 |
| CN | 102892339 A | 1/2013 |
| CN | 102905586 A | 1/2013 |
| CN | 202714725 U | 2/2013 |
| CN | 102958409 A | 3/2013 |
| CN | 202932765 U | 5/2013 |
| CN | 203074316 U | 7/2013 |
| CN | 203168872 U | 9/2013 |
| EP | 1501398 B1 | 9/2006 |
| EP | 1895880 A1 | 3/2008 |
| EP | 2036471 A1 | 3/2009 |
| EP | 2080458 A1 | 7/2009 |
| EP | 2 583 596 A1 | 4/2013 |
| EP | 2 633 788 A1 | 9/2013 |
| WO | WO-2008/155538 A2 | 12/2008 |
| WO | WO-2011/048078 A2 | 4/2011 |
| WO | WO-2012/151629 A1 | 11/2012 |

OTHER PUBLICATIONS

Extended European Search Report issued in European Patent Applicatino No. 14848898.4, dated Jun. 13, 2017.
International Search Report and Written Opinion for PCT/AU2014/000947, dated Oct. 29, 2014.
International Preliminary Report on Patentability for PCT/AU2014/000947, dated Apr. 5, 2016.
Search Report Issued in Russian Patent Application No. 2016117250, dated Jun. 28, 2018.
Office Action issued in Chinese Patent Application No. 201480064422.3, dated Dec. 3, 2018.
Extended European Search Report issued in European Patent Application No. 18206544.1, dated Jan. 15, 2019.
Office Action issued in Chinese Patent Application No. 201911172017.4, dated Apr. 25, 2021.
Office Action issued in Chinese Patent Application No. 201911165974.4, dated Apr. 6, 2021.
Examination Report issued in Australian Patent Application No. 2019271885, dated Jan. 18, 2021.

* cited by examiner

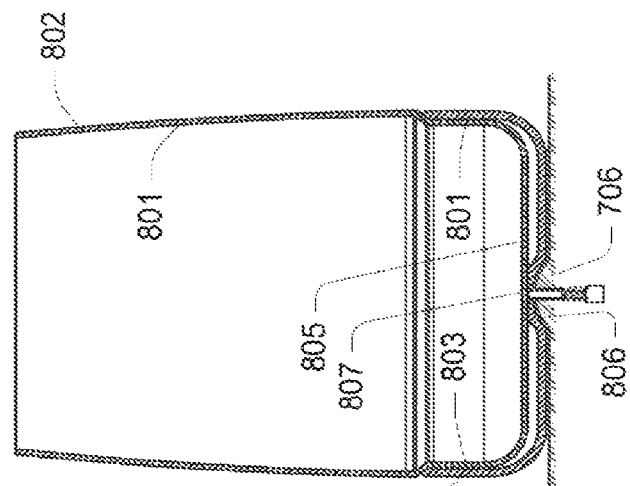
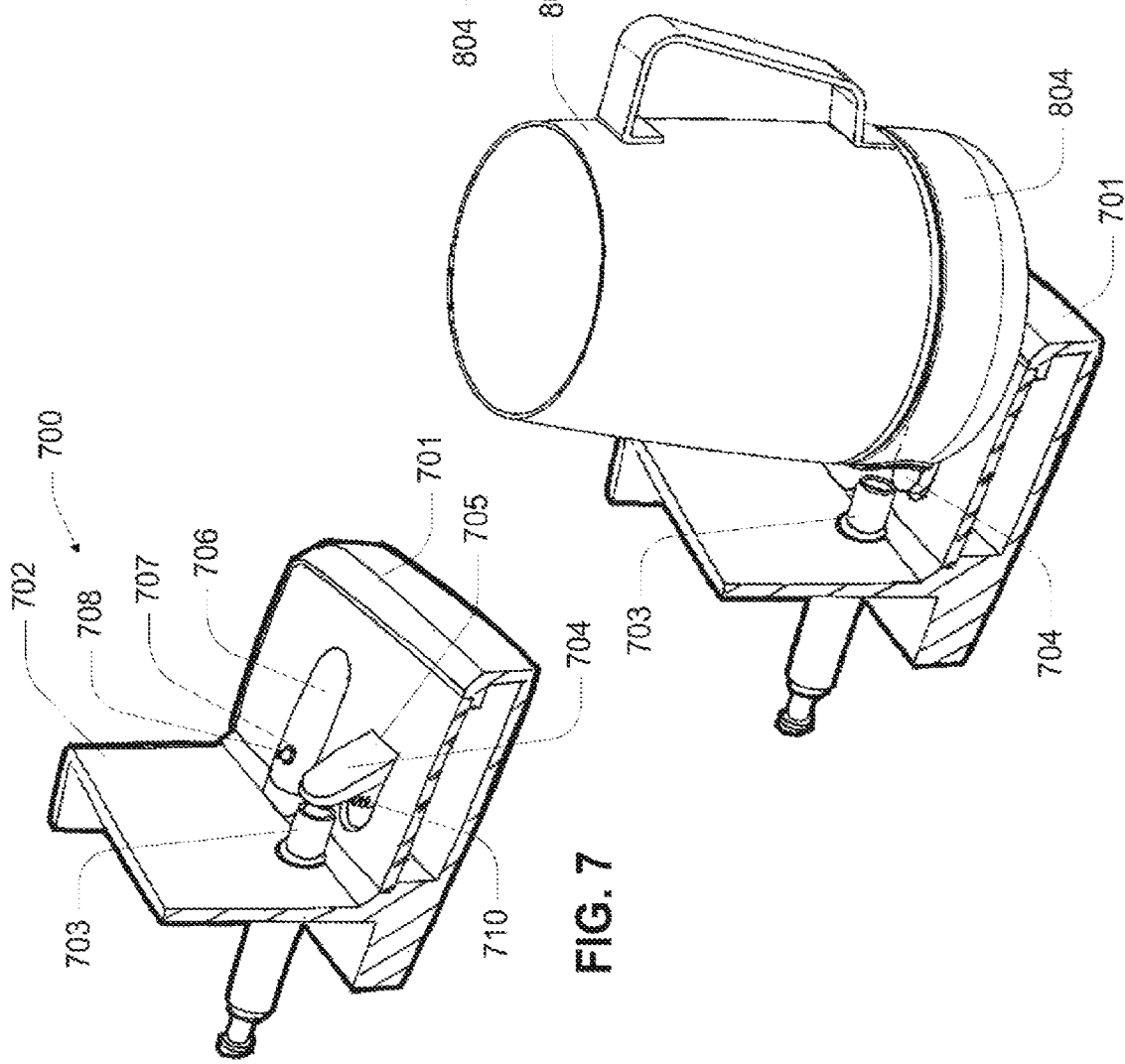

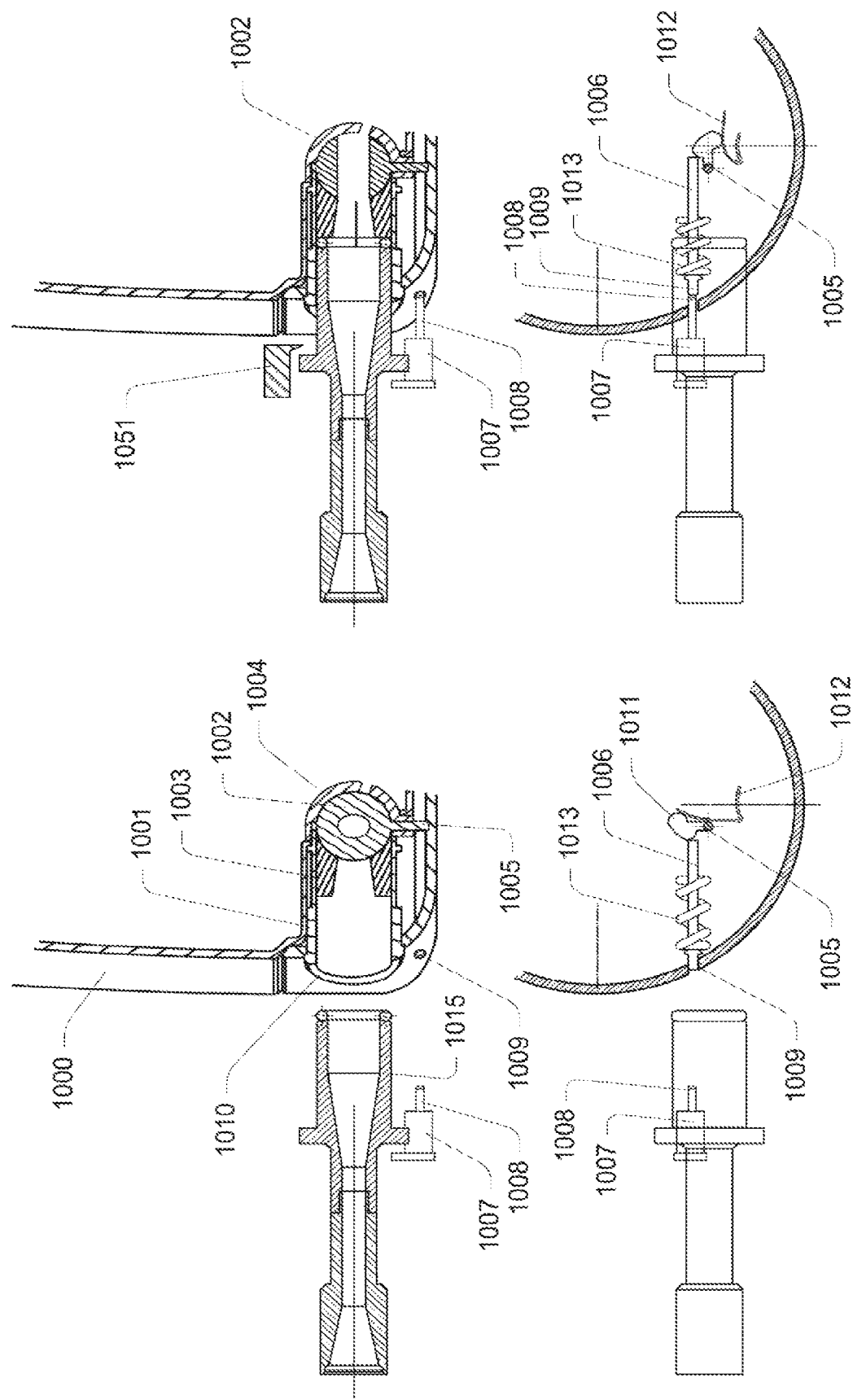

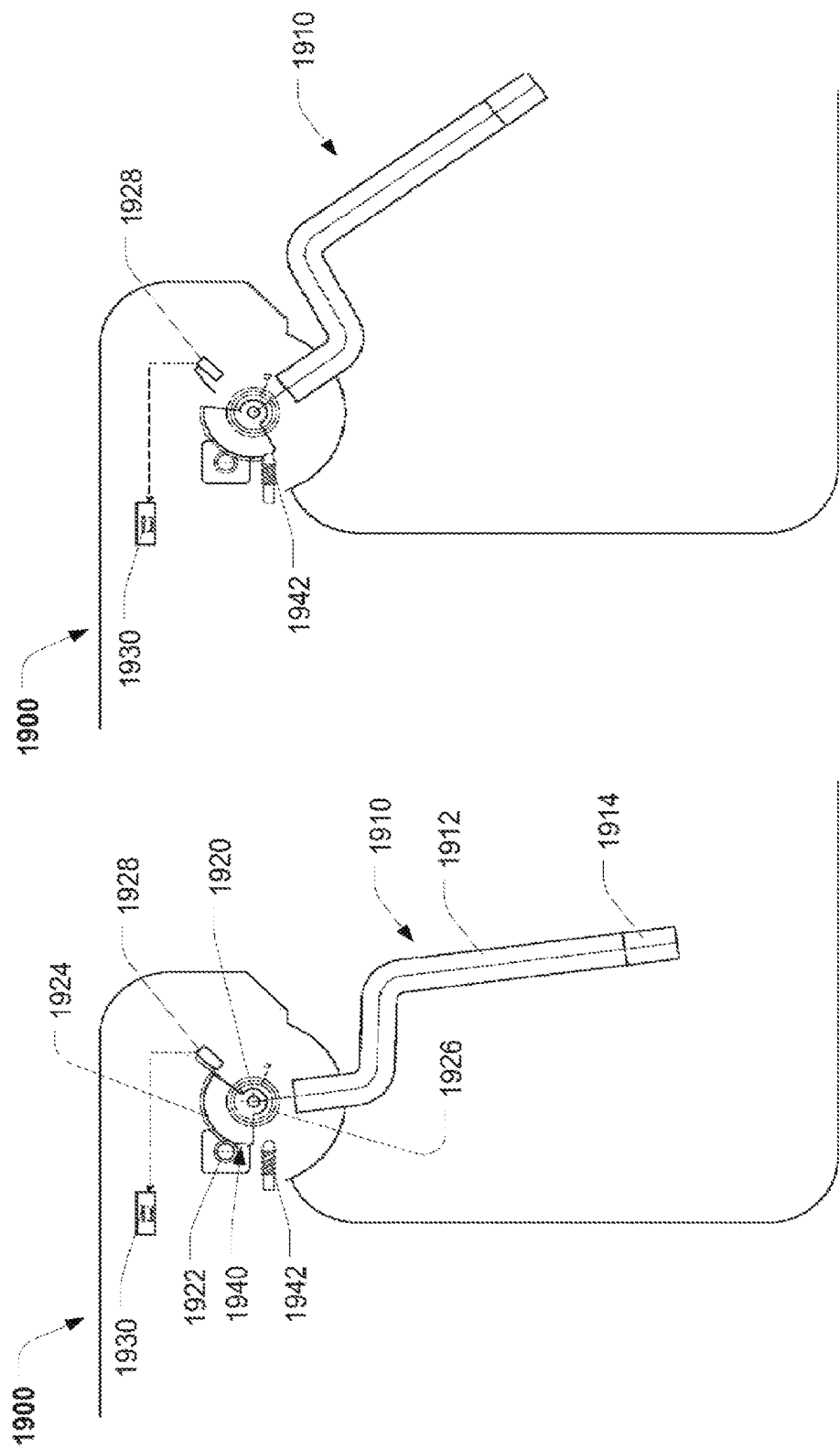

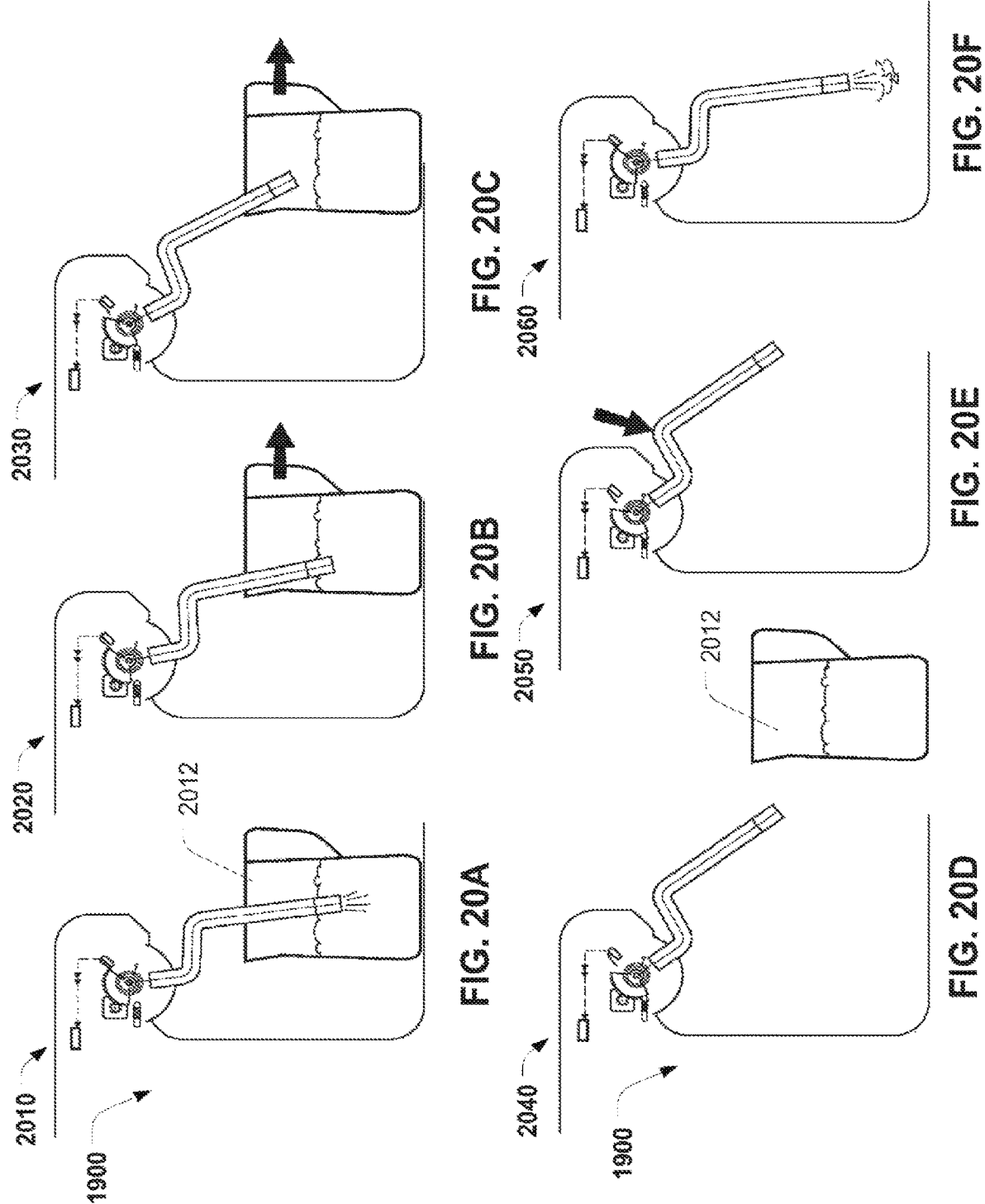

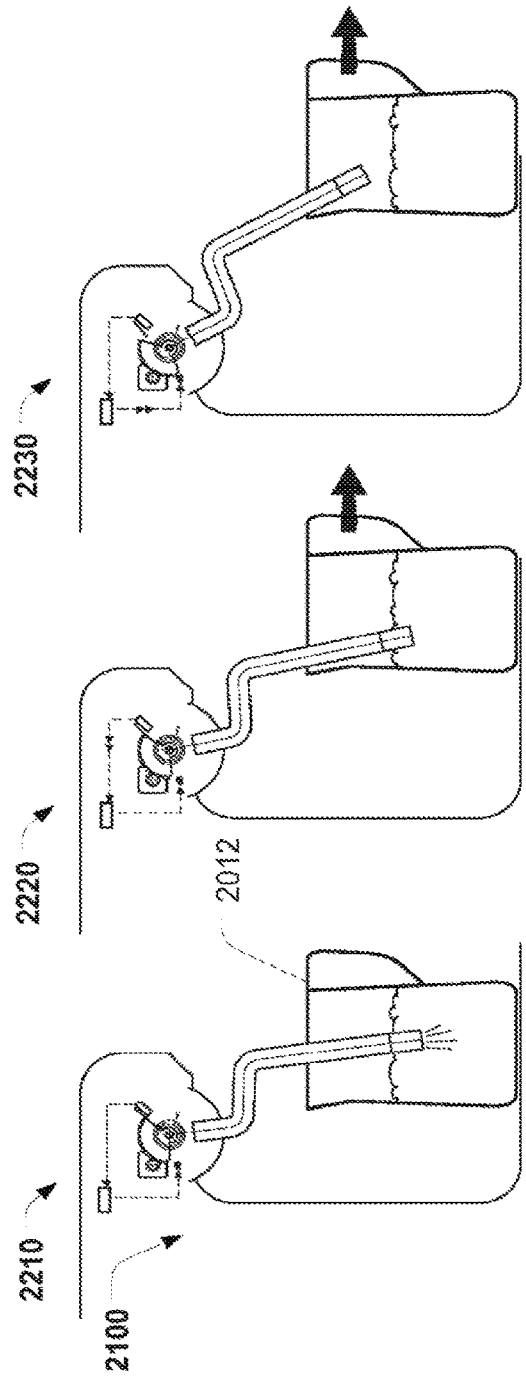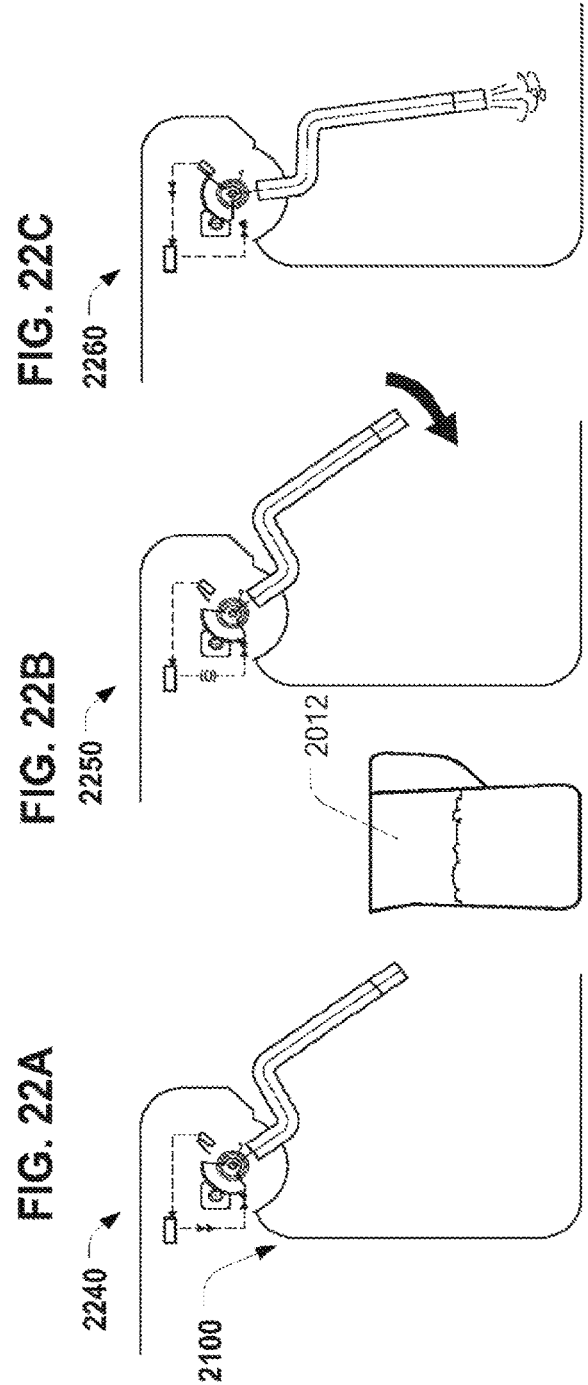

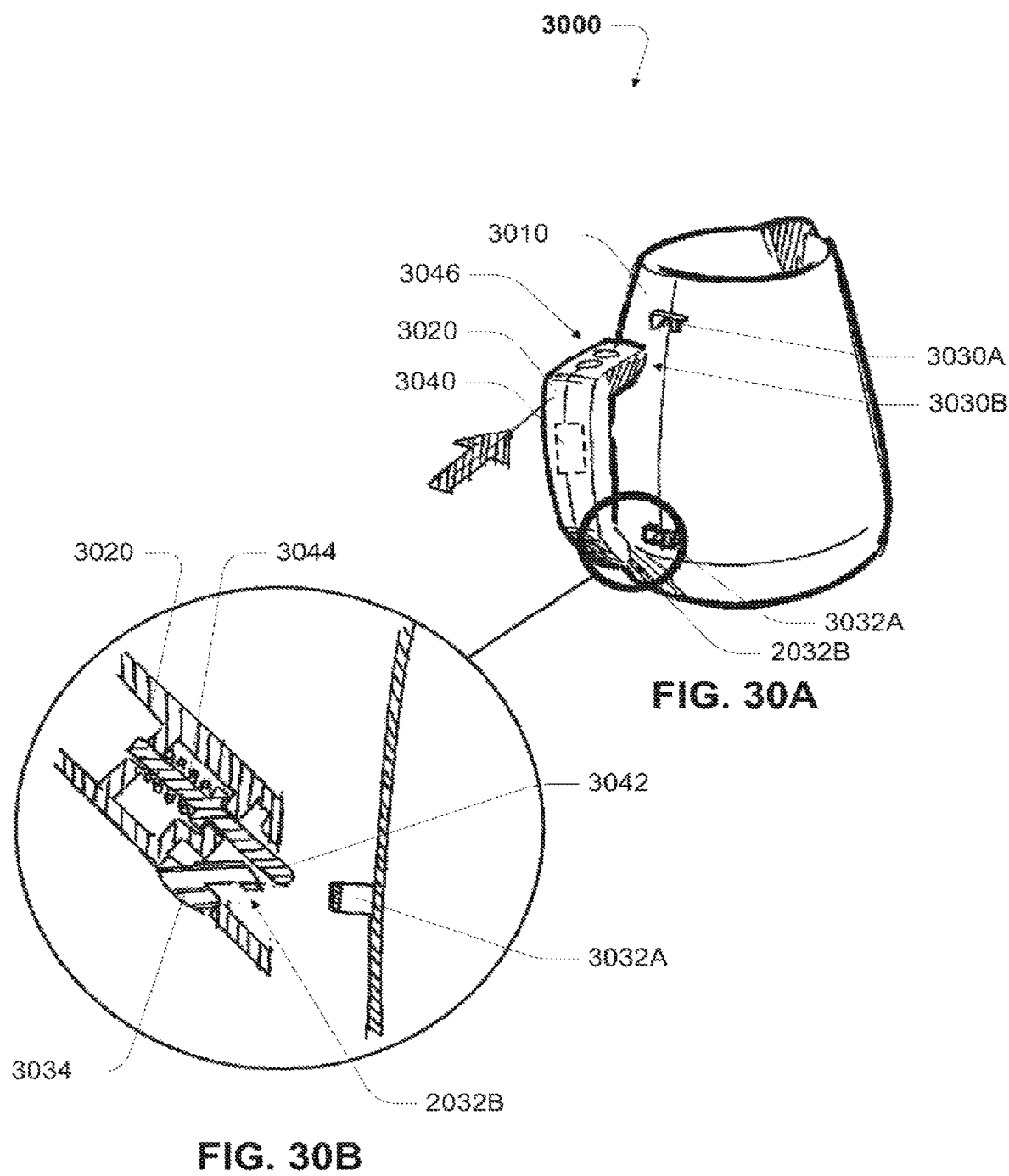

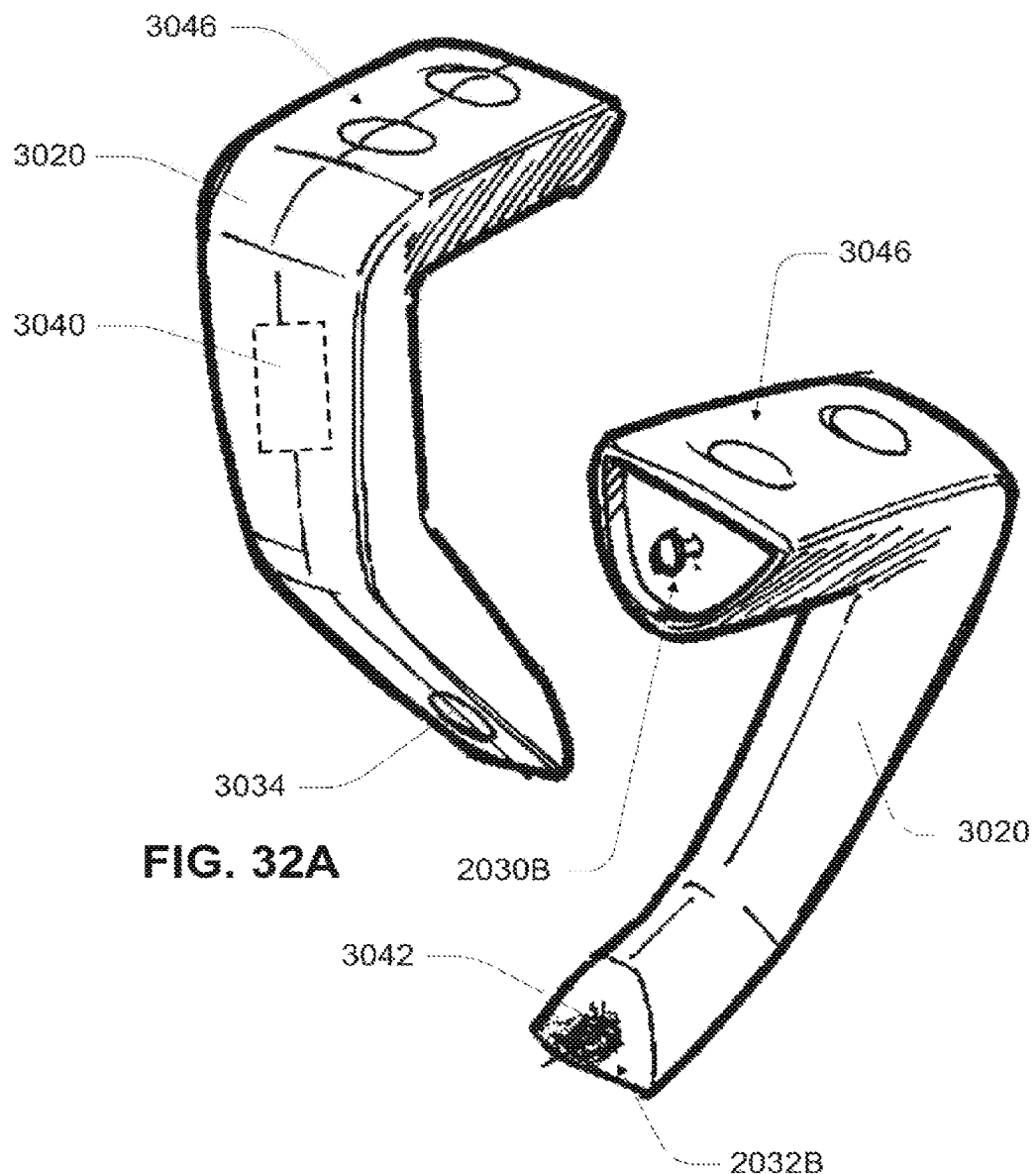

APPARATUS AND METHOD FOR FROTHING MILK

FIELD OF THE INVENTION

The invention relates to milk frothing and more particularly to methods and apparatus for milk frothing in an espresso making machine having a steam wand.

BACKGROUND OF THE INVENTION

Any discussion of the prior art throughout the specification should in no way be considered as an admission that such prior art is widely known or forms part of the common general knowledge in the field.

Steamed milk is used in the preparation of drinks such as latte, cappuccino and other hot beverages. When steamed milk is prepared in a jug, steam or a mixture of steam and air is generally introduced into the milk through a wand. However, the construction of a wand incorporating a temperature sensor such as a thermistor and also adapted to convey steam or a steam and air mixture is somewhat complicated and a system incorporating such a wand would benefit from simplification.

A steam wand has an end that is submersible into a container of milk. The wand injects steam or a mixture of steam and air into the milk. The end product is a milk froth. A milk froth has a target temperature and froth texture. Different milk froth textures are required for different beverages. Texture refers to the air content and bubble size distribution in a froth. Achieving the correct temperature and texture in the finished froth product requires either a skilled operator or a frothing device that is at least partially automated. The content of the Applicant's PCT patent application. WIPO publication numbers WO 2012/151629 is incorporated herein by reference.

SUMMARY OF THE INVENTION

According to an aspect of the invention there is provided an apparatus for milk frothing.

According to an aspect of the invention there is provided a coffee making and/or milk frothing apparatus that includes: a steam source and an air source coupled to an air injector module for mixing the air and steam.

Preferably, a solenoid controls release of steam flow to a steam wand via an air injector module.

Preferably, the air injector module includes a primary steam flow path, an air injection path and an outflow. More preferably, the air injection module can incorporate a venturi. Most preferably, the air injection flow path can receive pressured air delivered by an air pump. Further, the mixing device may be a simple T-piece device, or a T-piece venturi, that combines two fluid flow paths.

Preferably, a pressure sensor is coupled to the air ingress flow path. The pressure sensor may provide pressure measurements to the processor module.

According to an aspect of the invention there is provided a removable drip tray having a temperature sensor.

According to an aspect of the invention there is provided a jug for steaming milk. The jug may enable milk to be steamed via a detachable spigot through which steam or steam and air are introduced into the jug.

According to an aspect of the invention there is provided a milk steaming jug having a port for receiving a spigot, the spigot adapted to carry steam or a steam and air mixture and inject same into an interior of the jug.

According to an aspect of the invention there is provided a coffee making machine to have a spigot that carries a steam or steam and air mixture, the spigot being insertable into a cooperating jug having a port for receiving the spigot.

According to an aspect of the invention there is provided a coffee making machine having a spigot for conveying a steam or a steam and air mixture to a cooperating jug.

According to an aspect of the invention there is provided a steamed milk making machine to have a spigot that carries a steam or steam and air mixture, the spigot being insertable into a cooperating jug having a port for receiving the spigot.

According to an aspect of the invention there is provided a steamed milk making machine having a spigot for conveying a steam or a steam and air mixture to a cooperating jug, the machine also having a temperature sensor that makes contact with an exterior of the jug when the jug is affixed to the spigot.

According to an aspect of the invention there is provided a method and apparatus for creating steam and air mixtures within the steam boiler of an espresso machine.

According to an aspect of the invention there is provided a remote accessory such as a milk frothing jug that can provide user inputs to and feedback from a milk frothing process.

Preferably, the remote appliance can communicate with a respective appliance, the remote appliance may communicate with the respective appliance by way of wireless and/or wired communication. The remote appliance may include a temperature sensor for monitoring temperature associated with the remote appliance. Data indicative of the temperature may be transmitted to the appliance.

According to an aspect of the invention there is provided an apparatus for making espresso coffee, the apparatus including:
  a body having a steam vessel and a pressurised air source and a steam wand; the steam vessel having a heating element for providing a steam source; the pressurised air source coupled to steam vessel for delivering an air supply to the steam vessel; the steam wand being coupled to the steam vessel via an air-steam flow path there between for receiving an air-steam source; an output control valve, located in the steam flow path, controls the steam source there through; an electronic controller module within the body; the electronic controller module adapted to control operation of the heating element, pressurised air source and output control valve;
  a removable jug device including a processor element wirelessly couplable to the controller module; the jug device including a temperature sensor element for measuring temperature of fluid within the jug; temperature sensor element being coupled to processor element for enabling the processor element to transmit a signal indicative of a measured temperature to the control module; the steam wand delivers an air-steam mixture to the fluid;
  a user interface module coupled to the controller module for providing user input to the controller module; the control module receives user input of a selected temperature and selected texture; the control module, using the selected texture, determines a mixture of air and steam to specify an air-steam flow; the control module controls the pressurised air source and output control valve to deliver the specified air-steam flow during a frothing cycle; the control module receives the signal indicative of the measured temperature and closes the discharge valve when the measured temperature reaches the selected temperature to end the frothing cycle.

According to an aspect of the invention there is provided an apparatus for making espresso coffee, the apparatus including:
- a body having a steam vessel and a pressurised air source and a steam wand; the steam vessel having a heating element for providing a steam source; the pressurised air source coupled to steam vessel for delivering an air supply to the steam vessel; the steam wand being coupled to the steam vessel via an air-steam flow path there between for receiving an air-steam source; an output control valve, located in the steam flow path, controls the steam source there through;
- an electronic controller module within the body; the electronic controller module adapted to control operation of the heating element, pressurised air source and output control valve;
- a removable jug device including a processor element wirelessly couplable to the controller module; the jug device including a temperature sensor element for measuring temperature of fluid within the jug; temperature sensor element being coupled to processor element for enabling the processor element to transmit a signal indicative of a measured temperature to the control module; the steam wand delivers an air-steam mixture to the fluid;
- a user interface module coupled to the controller module for providing user input to the controller module; the control module receives user input of a selected temperature and selected texture; the user interface including a variable user input for specifying the selected texture; the variable user input directly regulates the operation of an air pump that provides the pressurised air source; the variable user input provides a feedback signal to the controller for indicating the selected texture; the control module activates the pressurised air source and output control valve to deliver the specified air-steam flow during a frothing cycle; the control module receives the signal indicative of the measured temperature and closes the discharge valve when the measured temperature reaches the selected temperature to end the frothing cycle.

The apparatus may have a removable jug device that includes secondary user interface forming a portion of the user interface for enabling user input of the selected temperature and/or the selected texture.

The apparatus may have steam wand that is associated with a position sensor that can indicate when the steam wand is returned to an upright home position; such that a cleaning cycle is initiated only when the steam wand is in the upright home position.

The apparatus may have an output control valve that selectively operates as either fully closed, open to an overflow path or open to air-steam flow path. The overflow path may be in communication with a drip tray.

The apparatus may have a output control valve that is in the form of a 3/2 solenoid output control valve; the valve having a valve sensor that transmits a signal indicative of a valve position to the controller module; the controller module causing the valve position to be indicated on the user interface.

The apparatus may have a variable user input that is used to specify the selected texture. The apparatus may enable user selection of temperature and/or texture that can be adjusted during the frothing cycle. The pressurised air source may be continuously adjusted by the controller module during a frothing cycle to provide differing quantities of air from full flow rate to no flow.

The apparatus may have pressurised air source that is supplied by a positive displacement pump that delivers pressurised air to the boiler.

The apparatus may have a gas mixer located in the air-steam flow path for enhancing combining of the discharged air and steam.

The apparatus may further includes one or more of the following sensors coupled to the controller module a boiler temperature sensor for monitoring temperature within boiler; a boiler humidity sensor for monitoring humidity within the boiler; a pressure sensor for monitoring pressure within the boiler; a level sensor for monitoring fluid level within the boiler; and a pressure sensor for monitoring temperature of flow in the air-steam flow path; one or more of the following sensors providing a signal for selective display on the user interface.

The apparatus may have a processor element of the removable jug device that is connected to the controller module via a wireless interface. The wireless interface may be bi-directional. The wireless interface may use a near field communication protocol. Electrical power can be wirelessly communicated to the removable jug device.

The removable jug device can includes a second user interface that includes user inputs to selectively define operation parameters relating to the finished frothed product and sensing devices such as a temperature sensor.

User adjustable input parameters may include froth amount and/or froth volume and/or froth temperature and/or selecting flow start and/or selecting flow start stop.

According to an aspect of the invention there is provided a jug for use with a frothing apparatus, the jug comprising:
- a vessel body for holding a liquid to be heated;
- a handle attached to the vessel body, the handle for holding the jug;
- a user interface for receiving an operation-related user input;
- a communication means adapted to communicate data associated with the jug to the frothing apparatus; and
- a controller for controlling the user interface and the communication means.

The jug may further comprise a temperature sensor adapted to measure a temperature of the liquid or of a wall of the vessel body.

The jug may further comprise a power means adapted to provide power for operation of the user interface, the communication means and the temperature sensor. The power means may comprise a power storage, and wherein the power storage is chargeable via wireless transmitted power signals received via the communication means.

The communication means may comprise a wireless communication means. The wireless communication means may comprise a radio frequency (RF) transceiver and wherein the frothing apparatus is adapted to receive the communicated data via a cooperating radio frequency (RF) transceiver. The communication means may be bidirectional, and the communication means may be adapted to receive data from a group consisting of: frothing apparatus status data, heating process status data, and wireless transmitted power signals.

Data associated with the jug may be selected from a group consisting of: the operation-related user input and the measured temperature. The operation-related user input may be selected from a group consisting of: a temperature setting, a froth setting, a start selection and a stop selection. The operation-related user input may comprise an additional user input received after heating of the liquid has commenced.

The handle may carry the user interface, the communication means, the temperature sensor, the power means and associated electrical and/or electronic components; and wherein the handle is removably attached to the vessel body of the jug.

The user interface may comprise a display, and wherein the display is adapted to display information associated with the operation-related user input and/or data received via the communication means from the frothing apparatus.

According to an aspect of the invention there is provided a frothing apparatus adapted to cooperate with t jug for heating a liquid in the jug, the frothing apparatus comprising:
  a steam heater, a steam nozzle, and a steam path providing fluid communication from the steam heater to the steam nozzle for delivering heating steam to the jug;
  communication means adapted to receive operating data from a cooperating communication means associated with the jug, the data comprising an operation-related user input; and
  a controller for controlling operation of the steam heater and the steam path based on the operation-related user input.

The operating data may further comprise measured temperature data, wherein the controller is adapted to control the operation of the steam heater and the steam path based on the measured temperature data.

The frothing apparatus may further comprise a pressurised air source coupled to the steam heater for delivering an air supply to one or more of the steam heater, the steam path or the steam nozzle for adding froth to the liquid being heated.

The operation-related user input may be selected from a group consisting of; a temperature setting, a froth setting, a start selection and a stop selection.

The communication means may comprise a wireless communication means. The wireless communication means may comprise a radio frequency (RF) transceiver. The communication means may be bidirectional, wherein the communication means is adapted to send data to the jug, the sent data selected from a group consisting of: frothing apparatus status data, heating process status data, and wireless transmitted power signals.

According to an aspect of the invention there is provided an espresso making machine comprising a frothing apparatus as disclosed herein.

BRIEF DESCRIPTION OF THE DRAWINGS

A preferred embodiment of the invention will now be described, by way of example only, with reference to the accompanying drawings in which;

FIG. 7 is a perspective view of a section of a coffee machine illustrating steamer spigot, its cover, the jug alignment feature and protruding temperature sensor;

FIG. 8 is a schematic cross-section of a jug with alignment groove in contact with an alignment feature and temperature sensor;

FIG. 9 is a perspective view illustrating the interaction between a steamer jug and retractable spigot cover;

FIG. 10 shows cross sections in elevation and plan view of a jug and spigot arrangement incorporating a ball valve, shown in the closed position;

FIG. 11 shows cross sections in elevation and plan view of a jug and spigot arrangement incorporating, a ball valve, shown in the open position;

FIG. 19A and FIG. 19B show an embodiment milk frother apparatus;

FIG. 20A through FIG. 20F show configurations of an embodiment milk frother apparatus;

FIG. 22A through FIG. 22F show configurations of an embodiment milk frother apparatus;

FIG. 30A shows an embodiment jug for frothing milk, shown with detached handle;

FIG. 30B shows an enlarged partial cross section view of the embodiment jug of FIG. 30A;

FIG. 32A shows an embodiment handle for a jug of FIG. 30A; and

FIG. 32B shows the embodiment handle of FIG. 32A;

PREFERRED EMBODIMENT OF THE INVENTION

Steamer Jug

Figure 1:
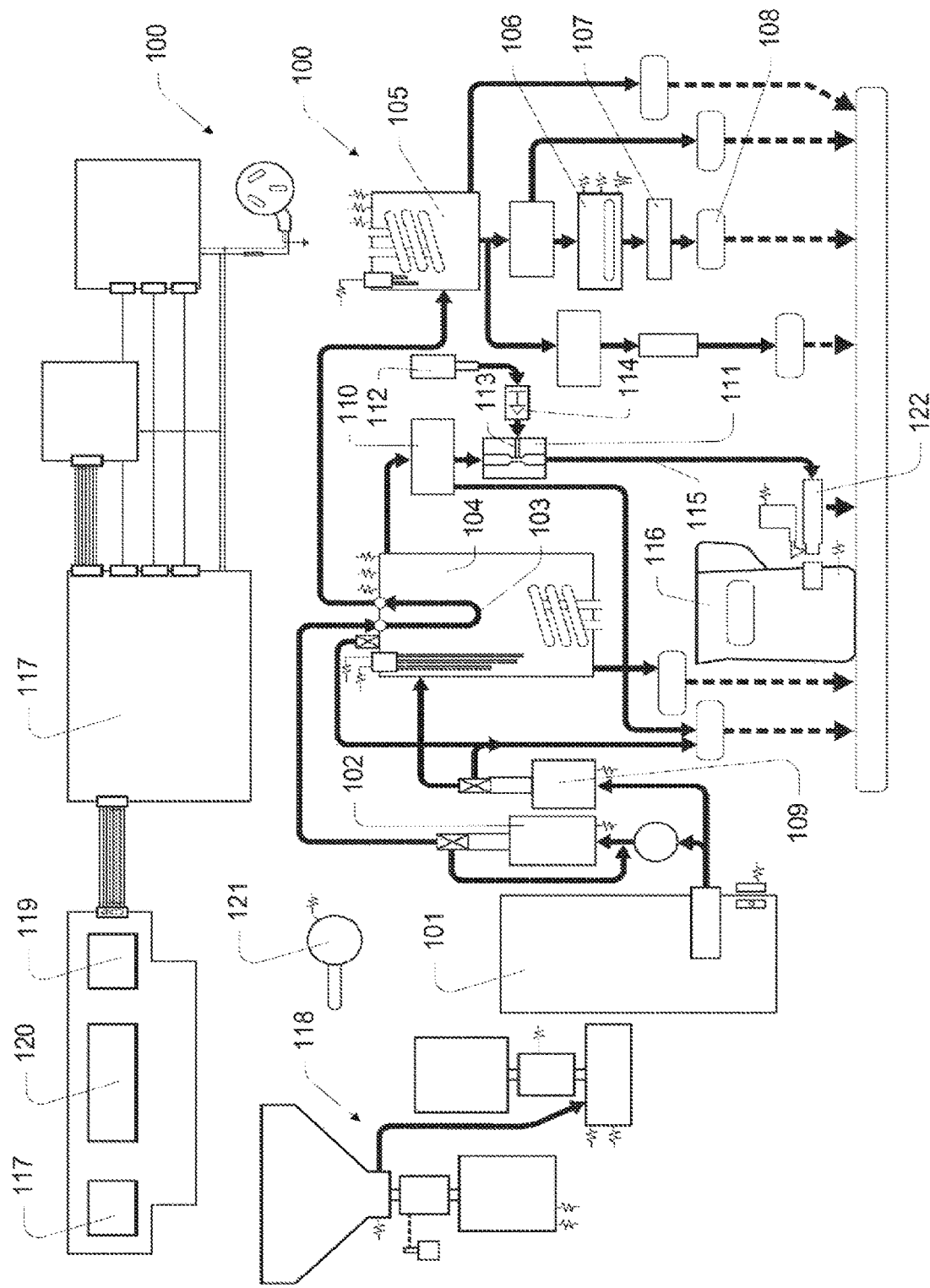
FIG. 1 is a schematic diagram of an espresso making machine incorporating a steamer spigot.

As shown in the example of FIG. 1, an espresso making machine 100 comprises a water tank 101 that is associated with a pump 102 that supplies water to a heat exchanger 103 in a steam boiler 104. Water thus pre-heated by the heat exchanger 103 is supplied to a second boiler 105 that provides hot water to a group head 107 or group element 106. Hot water discharged from the group head 107 is used to brew espresso coffee 108. It will be appreciated that other arrangements may be utilised to brew coffee.

The water tank 101 is also associated with a second pump 109 that supplies water to the steam boiler 104. The steam boiler 104 discharges to a solenoid controlled valve 110. Steam discharged from the valve 110 flows through a venturi 111. The supply of steam passing through the venturi 111 may be augmented with a flow of air either drawn through the venturi's suction port 113 or otherwise augmented with an air pump 112 that discharges into the venturi's suction port 113. A one-way valve 114 prevents back flow into the optional air pump 112. Accordingly, steam or a mixture of steam and air that is used to steam milk located in a jug 116 is discharged from the venturi 111 via a steam discharge 115.

It will be appreciated that the above referenced example is controlled from a main printed circuit board or other form of controller 117 that receives the various inputs and signals from the espresso making machine 100 and provides the necessary output signals to power and control the device. The controller 117 also operates one or more graphic user displays and indicators that are present generally on the front surface of the espresso making machine 100. Such displays may include a graphic display associated with the device's coffee grinder and tamping auger assembly 118, a display 119 associated with the steam or steam and air mixture produced by the espresso making machine 100 and another display or display area 120 associated with the other functions performed by the espresso making machine 100.

The espresso making machine 100 has an externally mounted steam lever 121 that can be activated by a user. When the lever 121 is activated, the processor or controller 117 causes either steam or a steam and air mixture to flow through the steam discharge 115 to a steamer spigot 122. The spigot 122 is adapted to be removably coupled to a removable milk steaming jug 116.

Figure 2:
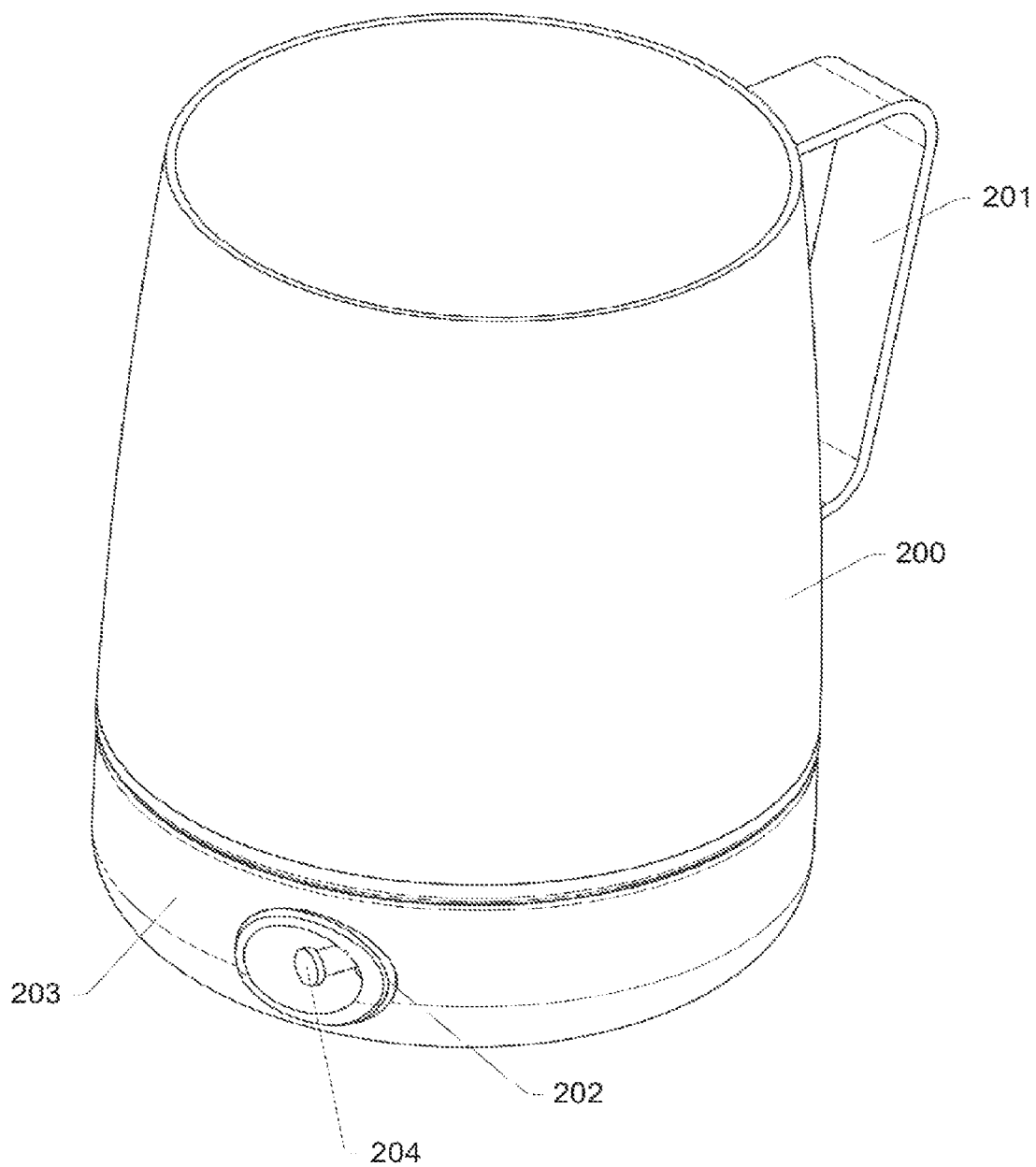
FIG. 2 is a perspective view of the jug used with the espresso making machine in FIG. 1.

As shown in FIG. 2, a steamer jug 116 as illustrated in FIG. 1 comprises a metallic (or at least partially metallic) open-ended body 200 having a handle 201. A lower portion of the body 200 is covered by a base 203 through which protrudes a port or inlet 202. The base may be polymeric or metal or other suitable material. The port 202 is sized and shaped to receive a steamer spigot. The part also retains a check valve or one-way flow valve 204. In some embodiments the body 200 and base 203 are integrally formed of the same material.

Figure 3:
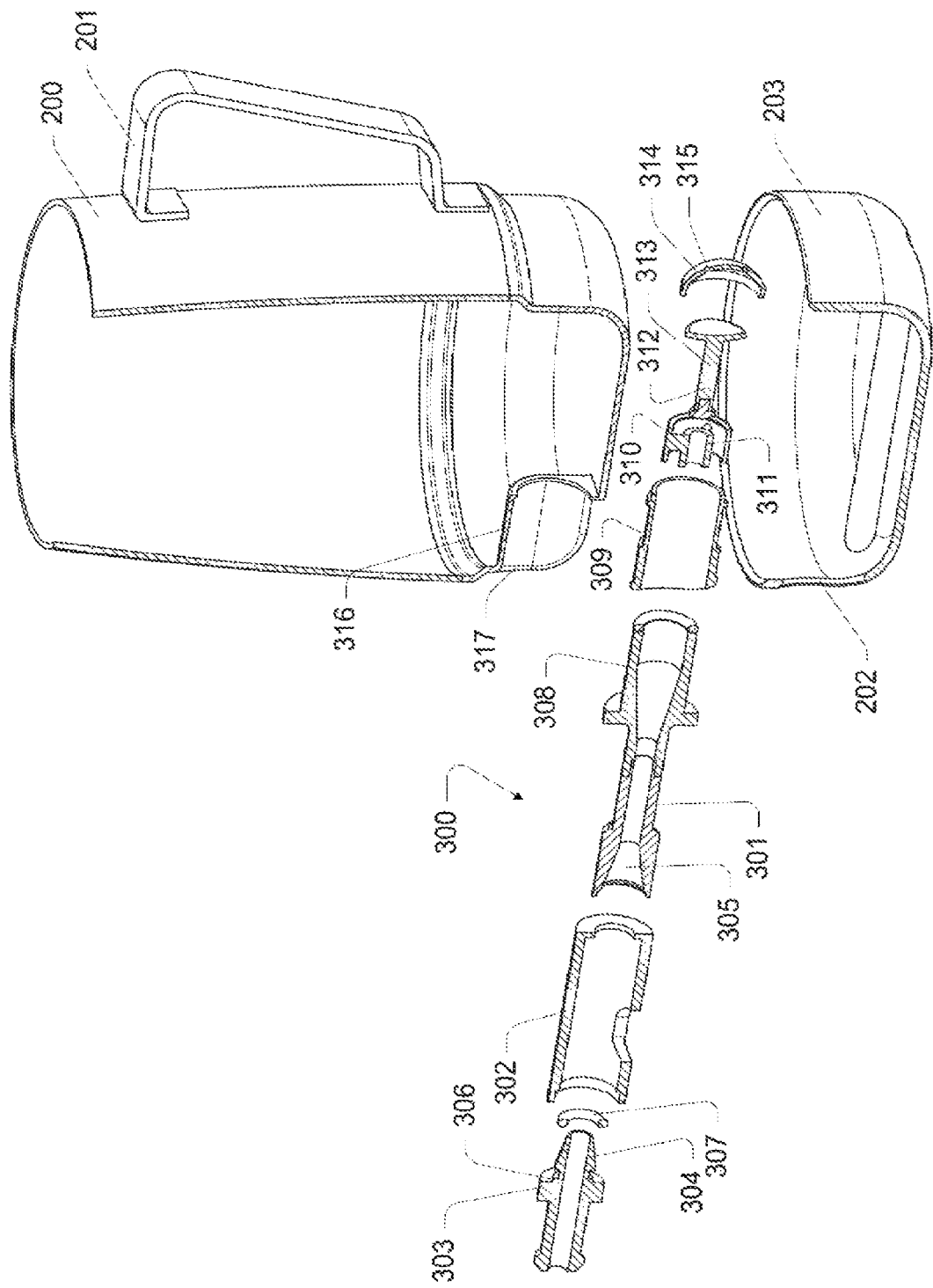
FIG. 3 is an exploded perspective view of a milk steaming jug and cooperating milk steaming spigot.

Aspects of the construction of the steamer spigot 300 are illustrated in FIG. 3. As suggested by FIG. 3 through FIG. 6, a spigot body 301 is partially contained within an overflow valve body 302. In preferred embodiments, the overflow valve body 302 is affixed to an overflow valve 303.

The overflow valve body 302 or valve 303 are preferably affixed to the coffee making or steam making machine. The overflow valve 303 has a tapered nozzle 304 that mates with a tapered nozzle seat 305 formed within a distal end of the spigot body 301. A groove 306 is located adjacent to the tapered nozzle 304 and receives an O-ring 307 that enhances the seal between the tapered nozzle 304 and tapered nozzle seat 305. A proximal and cylindrical end 308 of the spigot body 303 is removably received within the valve body 309 which is itself removably retained by the jug body 200. The valve body 309 carries within it a valve seat 310. The valve seat 310 has (for example) a cylindrical, internal bearing surface 311 that receives the shaft 312 of a reciprocating valve sealing member 313. Other check valve types may be used. The valve body 309 is received within a spigot receiving socket 316 that is integral with the metallic jug body 200. The open-end 317 of the spigot receiving socket is accessible through the port 202 that passes through the jug base 203. An opposite or submerged end of the socket 316 is capped with a steam nozzle 314 having one or more through openings 315.

Figure 4:
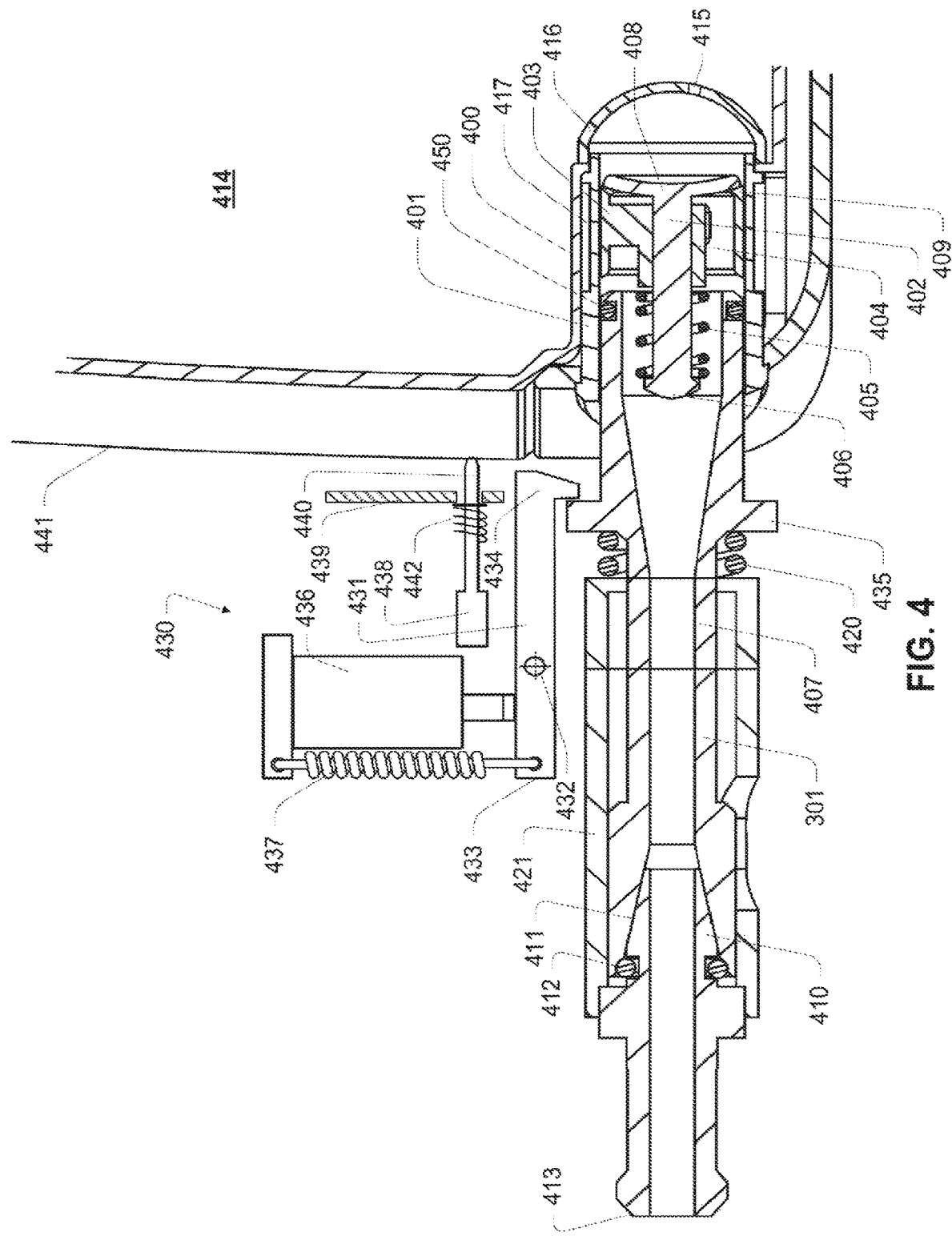
FIG. 4 is a cross-sectional view of a steamer spigot inserted into a steamer jug having a check valve.

As shown in FIG. 4 the jug's steamer socket 400 semi-permanently retains the valve body 401.

It is held in place by friction or mechanical means and stays in place when the spigot body 301 is withdrawn from it.

The reciprocating valve 402 within the valve body 401 is supported by the valve seat 403. Because it is supported by the cylindrical bearing surface 404 of the valve seat 403, the valve reciprocates between open and closed or sealed orientations. A compression spring 405 biases or urges the valve to close 402 because it is inserted between the enlarged distal head 406 of the valve stem and a distal surface of the valve sent 403. The pressure exerted by the steam or steam and air mixture exiting the spigot 407 is enough to overcome the bias exerted by the spring 405 and to drive the valve's head 408 out of engagement with the cooperating valve seat 409. In preferred embodiments, the valve seat 409 is of a spherical kind and the seat contacting surface of the valve's head 408 is also of a spherical kind. The head 408 is sized to the interior of the valve body 401 to maximise the forces acting on the valve 402.

In FIG. 4, the open proximal end of the spigot 407 has a circumferential groove containing an O-ring 450. The O-ring 450 creates a seal between the spigot 407 and the valve body 401 and contributes friction that prevents the spigot 407 from being prematurely ejected from the valve body 401.

When fully inserted, as suggested by FIG. 4, the tapered nozzle 410 is in sealing engagement with the tapered nozzle socket 411 and the seal between them is further provided by or enhanced with the nozzle's circumferential O-ring 412. Accordingly, steam or a steam and air mixture entering from the distal end of the overflow valve 413 will exert a force on the head 408 of the valve 402 and open it. The steam or steam and air mixture will thus enter the interior of the valve body and be discharged into the interior 414 of the jug via the through openings 415 in the steam nozzle 416. An optional circumferential groove 417 around the exterior of the valve body reduces excessive friction between the valve body and the steamer socket, allowing it to be removed for cleaning, maintenance or repair, but not when the nozzle is withdrawn.

In the embodiment of FIG. 4, a compression spring 420 is located between the overflow valve body 421 and the spigot. In this example, a latch assembly 430 prevents the overflow valve body from being inadvertently separated from the distal end of the spigot.

The latch assembly 430 comprises a mechanical latch 431 having a pivot 432 located between the distal end 433 and the working end or head 434 of the latch 431. A tension spring 437 urges the head 434 into engagement with a radially extending flange 435 formed on the spigot. The solenoid 436 may be activated to disengage the head 434 from the flange 435. The tension spring 437 returns the head 434 to the locked or engaged orientation.

An optional temperature sensor 438 (such as a NTC thermistor) may be attached to or affixed to the espresso or steam making machine 439 so that the sensor tip 440 makes contact with an exterior surface 441 of the jug when the jug is seated. The temperature sensor 438 may be biased toward the jug or urged in the direction of the jug by, for example, a compression spring 442. Temperature data is be conveyed to the controller 117 from the temperature sensor 438. In some embodiments the data connection is a wired connection from the sensor 438 to the controller 117. In other embodiments the data connection is a wireless connection such as a wireless RF signal.

In some embodiments the temperature sensor 438 is attached to or affixed to the jug 116 itself, and where the jug is removable, the data connection is a wireless connection and the data transmitter is located in, 011 or adjacent the jug.

Figure 5:
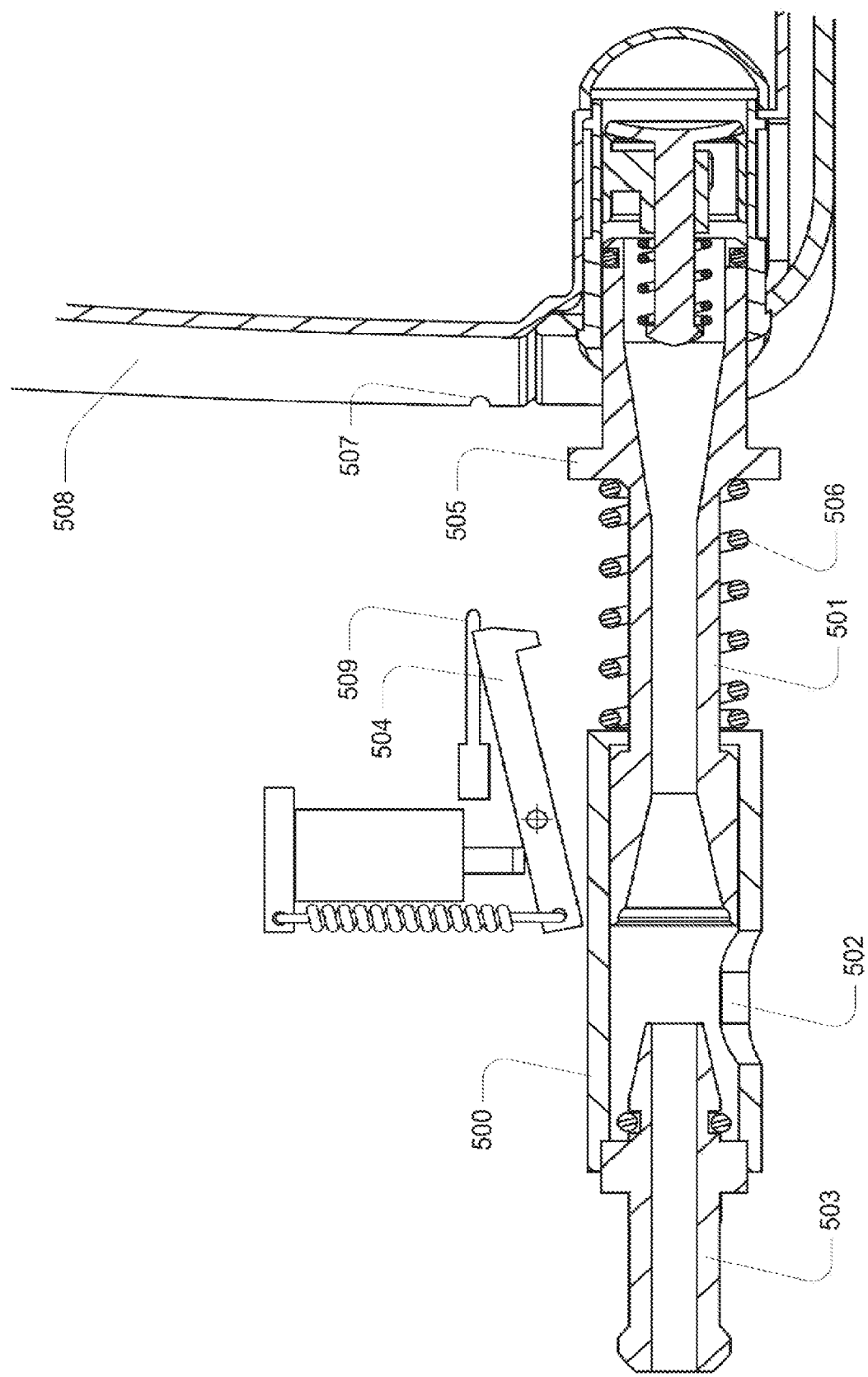
FIG. 5 is a cross-sectional view of a steamer spigot and steamer jug showing the spigot disconnected from the steam source, but connected to the jug.

As shown in FIG. 5, once the delivery of steam or steam and air has ceased, the spigot 501 may be withdrawn from the overflow valve body 500. A through opening 502 in the side wall of the overflow valve body allows any discharge from either the nozzle or the overflow valve 503 to be discharged. When the latch 504 is disengaged from the spigot's flange 505 the compression spring 506 reverts to its original shape as the jug and nozzle are displaced away from the fixed overflow valve body 500. FIG. 5 also illustrates that an exterior surface of the jug may incorporate a small indentation 507 for receiving and increasing the surface area of contact between the jug 508 and the tip of the temperature sensor 509.

Figure 6:
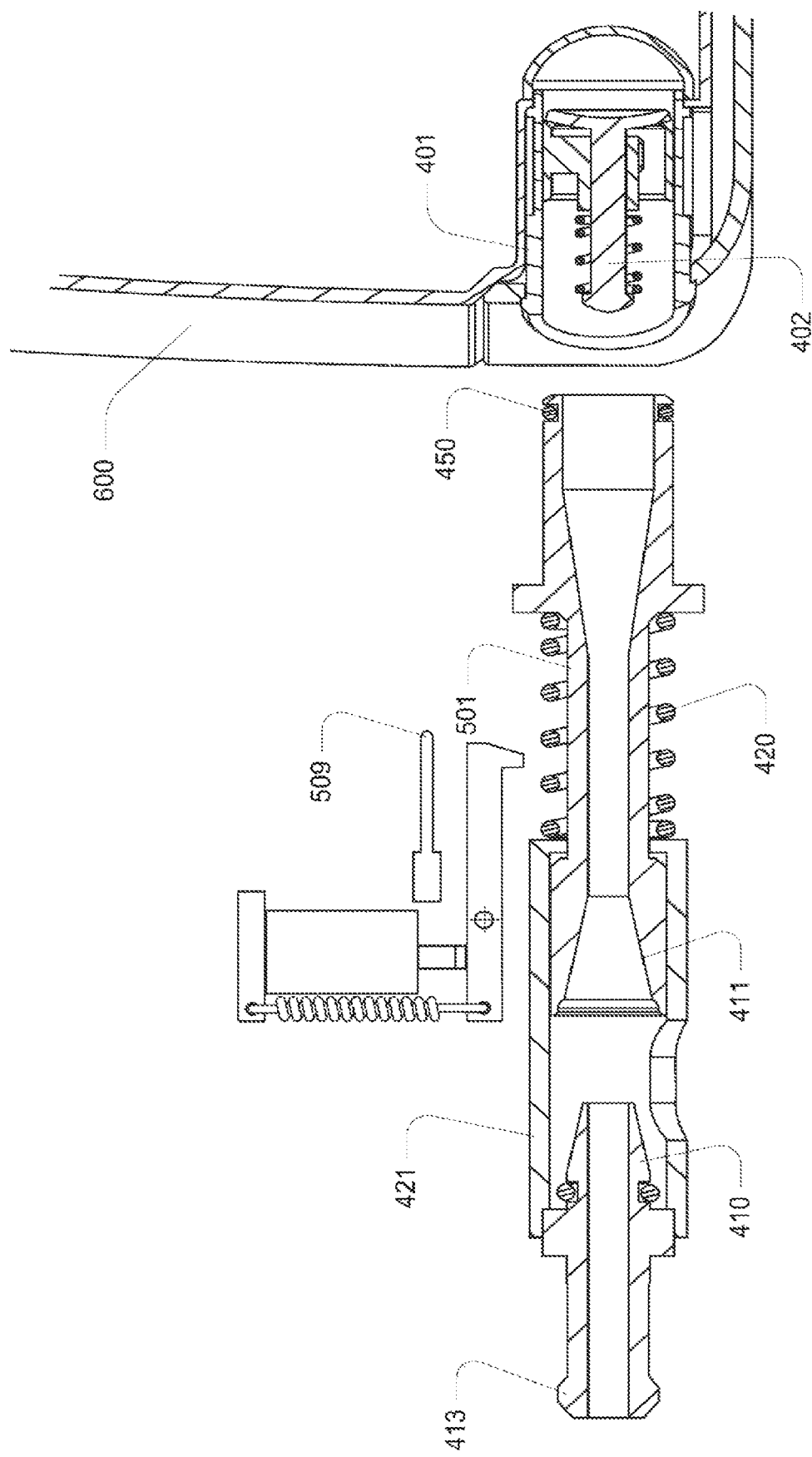
FIG. 6 is a cross-sectional view of a steamer spigot and steamer jug, with the spigot disconnected from the jug and the steam source.

As illustrated in FIG. 6, the jug 600 can be disengaged from the spigot, simply by overcoming the friction imposed by the spigot and/or its seal or O-ring 450.

As shown in FIG. 7, a coffee machine 700 has a base 701 adapted to receive a milk steaming jug 802 (see FIG. 8 and FIG. 9). The base 701 is adjacent to a sidewall 702 of the machine through which the steamer spigot 703 protrudes. A retractable cover 704 is provided to divert inadvertent discharge of steam from the spigot 703 when the spigot is not connected to a cooperating jug. The cover 704 is biased upward by a spring 710 and pivots about its lower end 705. The cover 704 covers the spigot's discharge opening when it is in its upright orientation (as illustrated). An upper surface of the machine's base 701 is also provided with a raised or protruding alignment feature 706. In this example, the alignment feature 706 is a raised hump that is sized and shaped to cooperate with an alignment groove 806 on the underside of a jug 802, as shown in FIG. 8. In the embodiment shown, the raised alignment feature 706 features an opening 707 through which protrudes a tip of a temperature sensor 708 (such as a NTC thermistor).

As described elsewhere herein, the temperature sensor may also form part of the jug or be attached to the jug, and as such be separate from the espresso machine or from the milk frother.

As shown in FIG. 8, the stainless steel reservoir 801 of the jug 802 has a necked or reduced diameter lower portion 803 that receives a polymeric jug base cover 804. Although the lower surface 805 of the preferably metal reservoir is flat, the underside of the cover 804 features a full width groove 806 that conforms in shape to the alignment feature 706. Because the lip of the temperature sensor 708 is preferably rounded, it slips into a through opening 807 in the alignment groove 806 so as to make contact with an underside of the stainless steel bottom 805 of the jug's reservoir 801.

In other embodiments the jug does not include a cover, and the base together with the features of the jug base (including the aligning groove) are integrally formed with the jug, for example from metal.

As shown in FIG. 9, a jug 802 is introduced onto the steam nozzle 901 by locating the underside of the base cover 804 onto the flat upper surface of the coffee machine's base 701 so the jug rests on the base 701. The jug 802 can then be slid along the alignment feature 706. The spacing between the alignment feature 706 and the spigot 703 ensures that the spigot 703 will enter the spigot receiving socket, as suggested by FIG. 4 through FIG. 6. As the jug 802 approaches the spigot 703, the jug will depress the spigot cover 704 so that it does not interfere with the engagement between the spigot and the jug. When the jug is withdrawn, the spigot cover 704 will return to its upright position as shown in FIG. 7 owing to the bias element 710.

As shown in FIG. 10 and FIG. 11, a jug 1000 for steaming milk incorporates a valve body 1001 in which is located a hall valve 1002. The ball valve 1002 is located between a valve seat 1003 and the perforated steam nozzle 1004. The ball valve 1002 is associated with an actuating shaft 1005 that is rotated from the open position to the closed position by the action of a push pin 2006. The push pin is actuated by a processor controlled solenoid 1007 having an output pin 1008 that is adapted to enter an opening 1009 adjacent to the valve body or spigot port 1010. The solenoid 1007 may be carried by the steam spigot 1015.

The processor will not actuate the solenoid 1007 unless the latch 1051 is engaged with the spigot. When the output pin 1008 is extended, it impinges on a proximal end of the push pin 1006. The distal end of the push pin 1006 acts on a lever or cam or the like associated with the rotating actuating shaft 1005. The lever or cam 1011 is biased into a closed position by a bias element 1012, spring, leaf spring or the like. As shown in FIG. 11, actuation of the solenoid 1007 causes an advancement of the actuating shaft 1008 which in turn advances the push pin 1006. The push pin rotates the actuating shaft 1005 against the bias of the spring element 1012 to place the preferably ceramic ball element of the ball valve 1002 into an open position wherein steam can exit the spigot, then pass through the ball valve 1002 and nozzle 1004. The return of the push pin 1006 to the closed position can be assisted by a second bias element or compression spring 1013.

Milk Frothing Apparatus

Figure 12:
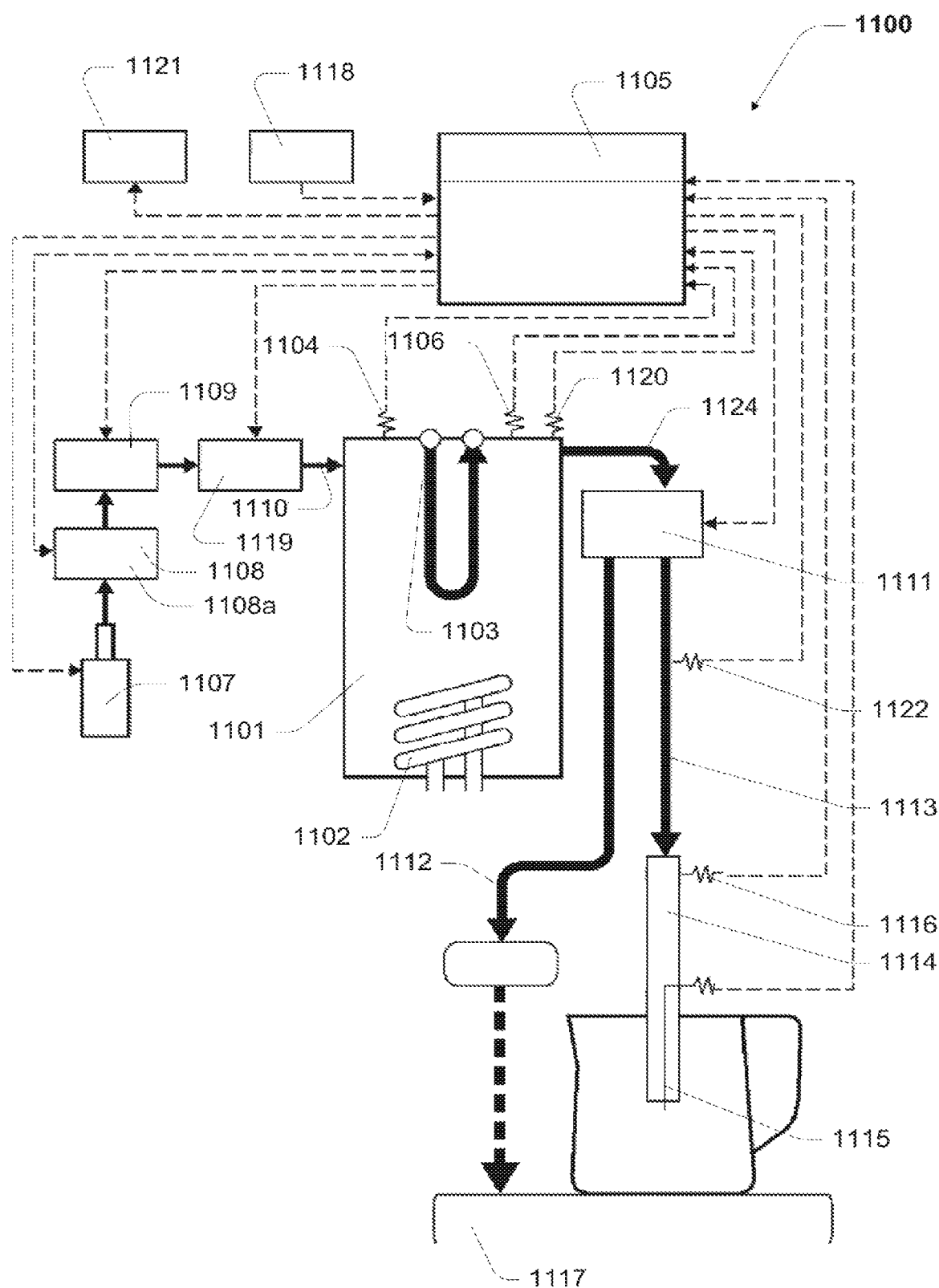
FIG. 12 is schematic diagram of an espresso making machine in which a steam and air mixture is produced in, and dispensed from, a steam boiler.

As shown in FIG. 12, an espresso making machine 1100 has within it a steam boiler not. In this example, the steam boiler 1101 has an internal heating element 1102 and an internal heat exchanger 1103 that may be used for heating or pre-heating hot water for brewing purposes.

Water is introduced into the steam boiler 1101 and is heated by the heating element 1102 to produce steam. The temperature of the contents of the steam boiler 1101 is monitored by a temperature sensor 1104 such as an NTC thermistor that communicates with the device's electronic controller 1105. In this example, the steam boiler 1101 is also associated with a humidity sensor 1106 that measures and communicates the humidity of the contents of the boiler 1101 by sending a signal to the controller 1105. The internal humidity of the steam boiler can be varied by introducing pressurised atmospheric air into the steam boiler 1101.

In this example, an air pump 1107 under the control of the controller 1105 delivers an air supply to a pressure controller 1108 that is also controlled by the controller 1105. The output of the pressure controller 1108 is moderated by a flow control module 1109 in this example. Adjustment to the flow control module by the controller 1105 will alter the air flow rate provided to the input of the solenoid valve 1119. In the alternative the air pump 1107 can deliver its air supply to a pressure sensor 1108*a* that communicates with the controller 1105. This allows the controller 1105 to regulate the pump 1107 in accordance with the output of the sensor 1108*a*. A pressure sensor 1120 may also be associated with the boiler 1101 and thus the boiler pressure may be monitored by the controller 1105, used by the controller in process control and also displayed on the display 1121. The pressure measured may also be used by the processor 1105 to control the operation of the air pump 1107 in response to the changing pressure conditions.

When the solenoid valve 1119 is open, pressurised air is introduced into the steam boiler 1101. Accordingly, the air content of the steam boiler 1101 can be increased with the introduction of pressurised air 1110 from the air pump or pressurised air source 1107. The operation of the air pump 1107, pressure controller 1108, flow control module 1109 and solenoid valve 1119 are controlled by the controller 1105 in accordance with user adjustable settings and by sensor devices such as the thermistor 1104 and the humidity sensor 1106. The output 1124 of the steam boiler 1101 is regulated by, for example, a 3/2 solenoid output control valve 1111. The boiler's output control valve tilt is either fully closed, open to an atmospheric overflow 1112 or directed to discharge via a discharge line 1113 into the device's steam wand 1114. The pressure of the boiler discharge line 1113 is measured by a pressure sensor 1122 and communicated to the controller 1105. The pressure sensor 1122 provides a signal which can be monitored by the controller, used by the controller in process control and also to display information on the display panel 1121 such as blockages in the wand 1114.

In some embodiments, the atmospheric discharge from the steam boiler is into the device's drip tray 1117. The steam wand 1114 is associated with a temperature sensor 1115 (such as an NTC thermistor) and/or an optional position sensor 1116.

In one example, user inputs from the user operated controls 1118 provide information to the controller 1105 about the desired or target temperature and froth texture of the finished froth product. From this input or inputs 1118, the controller 1105 determines the optimal air flow provided to the boiler 1101 and target temperature of the finished product. The controller 1105 then causes an opening of the output control valve 1111, causing the contents of the boiler 1101 to be discharged into and through the wand 1114. The controller 1105 closes the output control valve 1111 when the correct temperature signal, as measured and transmitted by the wand's temperature sensor 1115 indicates that the correct final temperature has been reached. The position sensor 1116 output allows the controller 1105 to cause the delivery of a purging dose of steam through the wand 1114 when the wand has been returned to a resting position, as is known in the art.

Figure 13:
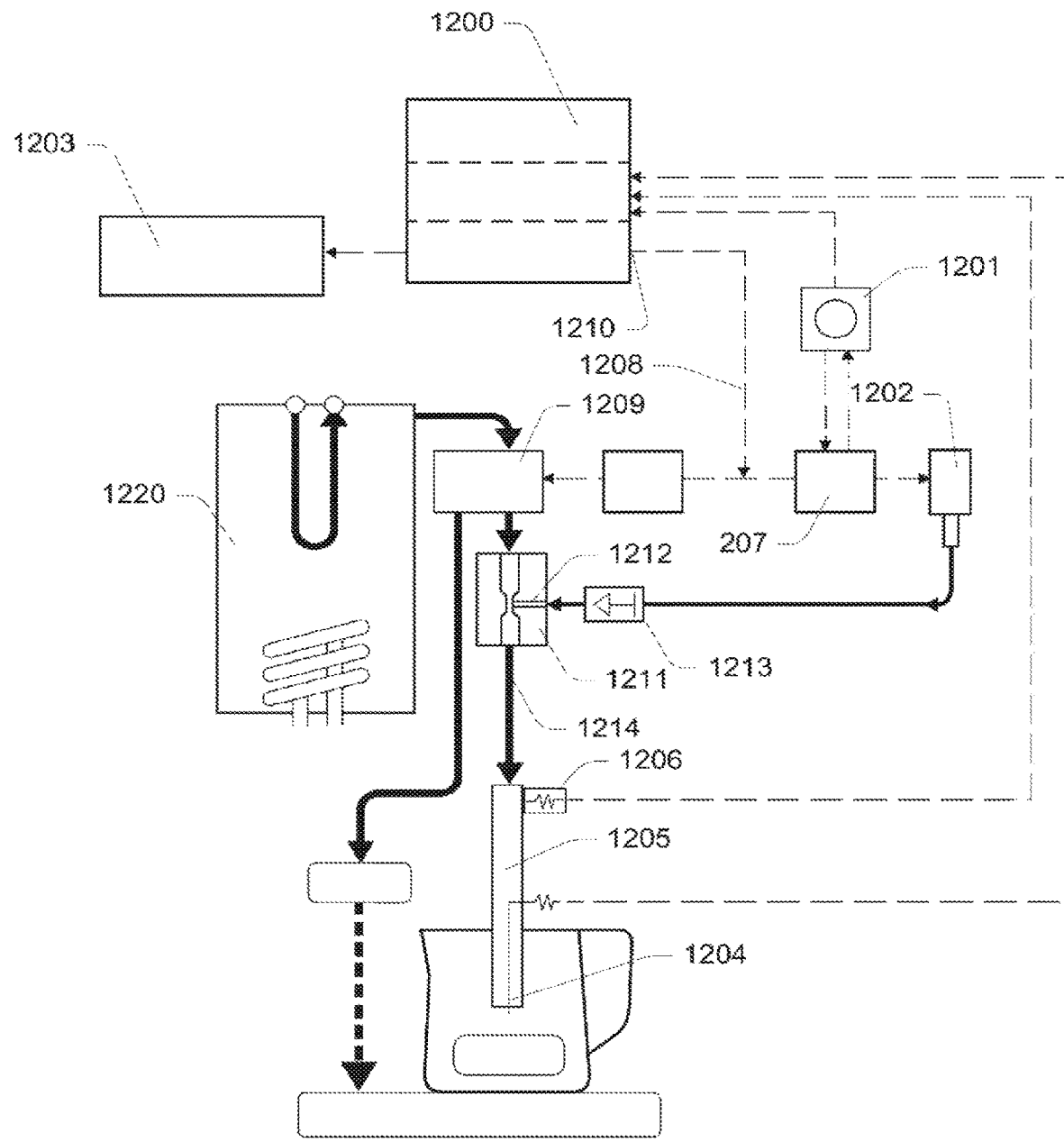
FIG. 13 is a schematic diagram of an espresso making machine that dispenses a user varied mixture of steam and air to a frothing wand.

Another embodiment is depicted in FIG. 13. In this example, the controller 1200 receives a manual user input from a variable potentiometer 1201 or the like that relates to a user preference regarding final froth texture. The potentiometer 1201 directly regulates the operation of an air pump 1202. The signal from the potentiometer 1201 to the controller 1200 is used by the controller 1200 to provide optional feedback to the user regarding the selected setting of the potentiometer 1201 on a display 1203 that is driven by the controller 1200. In this example, the controller 1200 also receives inputs from a temperature sensor 1204 such as an NTC thermistor associated with or located in or on the steam wand 1205. The controller 1200 also receives a signal input from a steam wand position sensor 1206. As with the previous example, the position sensor 1206 and temperature sensor 1204 allow the controller 1200 to deliver a purging dose of steam through the wand when the wand has been returned to a resting position, as is known in the art.

In this example, the potentiometer 1201 regulates the output of a DC-DC converter 1207 that is provided with a DC supply voltage 1208 from the controller 1200. The same voltage supply 1208 that is used to supply the converter 1207, potentiometer 1201 and air pump 1202 also supplies voltage to a control valve such as a 3/2 type boiler output solenoid 1209. Thus, the boiler output solenoid 1209 and air pump 1202 are switched on and off simultaneously from the same output pin 1210 of the controller 1200, even though the amount (flow rate and pressure) of air delivered by the pump 1202 is controlled by the manual or user operated control via the potentiometer 1201. When the boiler's output solenoid valve 1209 is open, the contents of the steam boiler 1220 are discharged by the valve 1209 into a venturi 1211.

The low pressure injector port 1212 of the venturi draws air discharged by the pump 1202 through a one-way or check valve 1213 that prevents backflow into the pump 1202. The steam and air are combined in the venturi 1211 and delivered through a common pipe or tube 1214 to the wand 1205. Thus, the ratio of steam to air is governed by both the performance of the venturi 1211 and the output of the air pump 1202 as determined by the potentiometer 1201. Because of the shared pin arrangement 1210, the controller 1200 causes the simultaneous shut-off of the boiler's discharge valve 1209 and air pump 1202 when the correct temperature has been reached, as determined by the wand's temperature sensor 1204 working in conjunction with the controller 1200.

Figure 14:
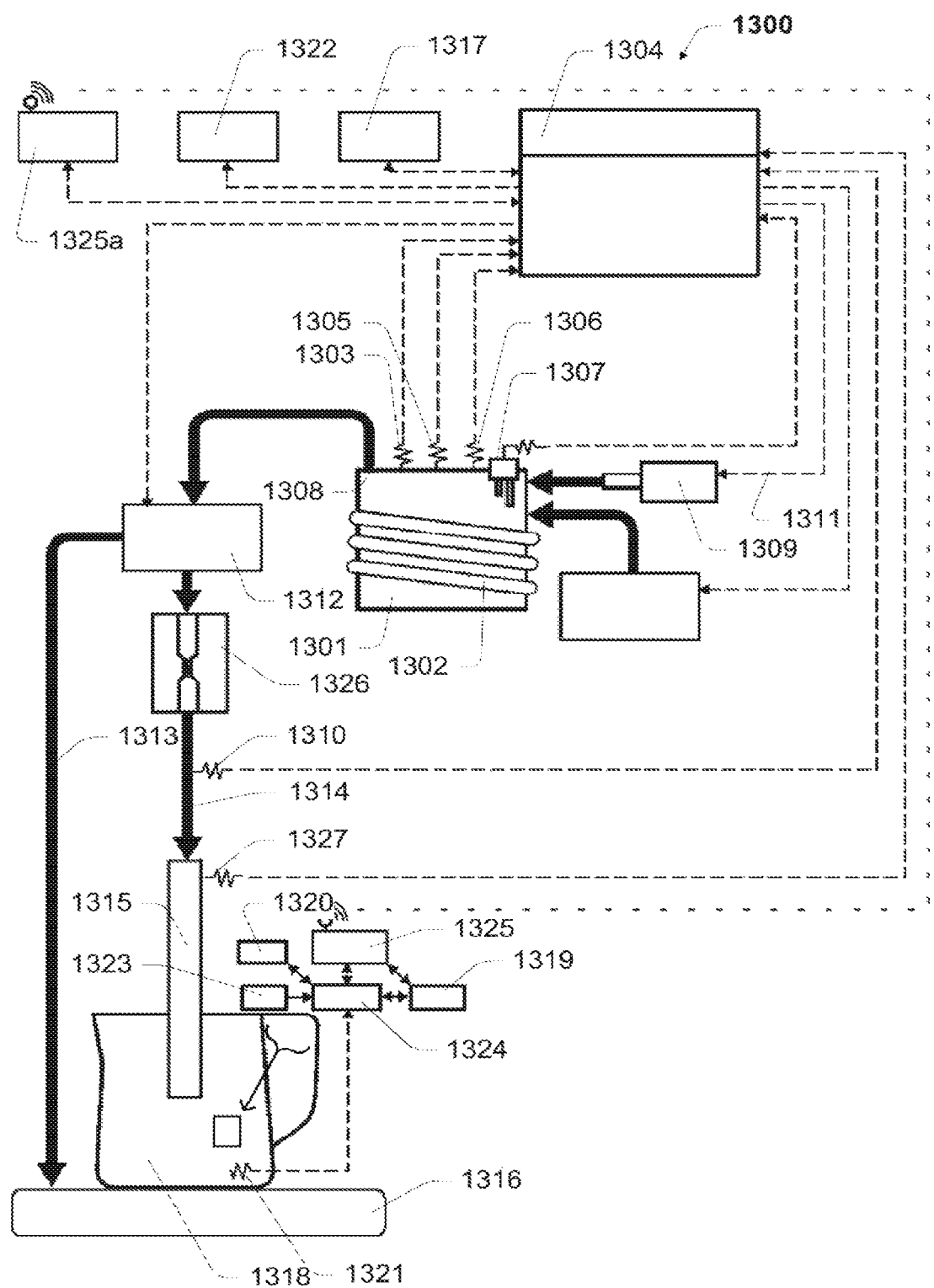
FIG. 14 is a schematic diagram of an espresso making machine in which a steam and air mixture is produced in, and dispensed from, a steam boiler.

As shown in FIG. 14, an espresso making machine 1300 has within it a steam boiler 1301. In this example, the steam boiler has an integrated heating element 1302. Water is introduced into the steam boiler 1301 and is heated by the heating element to produce steam. The temperature of the contents of the steam boiler is monitored h a temperature sensor 1303 such as an NTC thermistor that communicates with the device's electronic controller 1304. In this, example, the steam boiler is also associated with a humidity sensor 1305 that measures and communicates the humidity of the contents of the boiler to the controller 1304. A pressure sensor 1306 may also be associated with the boiler to monitor the internal pressure and communication with the controller, so the controller may display boiler pressure or status and control the heating element 1302 operation in response to the changing pressure and/or temperature conditions measured. A level sensor 1307 communicates with the controller 1304 and allows the water level in the boiler to be controlled to a level below that of the boiler's output 1308.

In this example, a pressurised air source 1309 which may be a positive displacement type pump under the control of the controller 1304 delivers an air supply directly to the boiler 1301.

Prior to or during the flow of steam out of the boiler, the air content of the steam boiler can be increased with the introduction of air from the air pump 1309. The operation of the air pump 1309 is controlled b the controller 1304 throughout an auto steam cycle in accordance with user adjustable settings and by sensor devices such as the thermistor 1303, humidity sensor 1305 or pressure sensors 1306, 1310.

The controller 1304 may provide, for example, a variable DC voltage 1311 to control the motor, or PWM, AC frequency control, or otherwise as required. The air source 1309 can be continuously adjusted by the controller 1304 to provide differing quantities of air to the system from full flow rate to no flow at all.

The output of the steam boiler is activated by, for example, a 3/2 solenoid output control valve 1312. In the alternative, the output valve 1312 may be manually activated. In some embodiments a manual output valve 1312 is a ceramic disk type valve with a position sensor that transmits a position signal to the controller 1304 so that the controller may provide a graphic indication of the valve's manually set position on the display 1322. The boiler's output control valve 1312 is either fully closed, open to an atmospheric overflow 1313 or directed to discharge via a steam conduit 1314 into the device s steam wand 1315. In some embodiments, the atmospheric discharge from the steam boiler is into the device's drip tray 1316.

The controller activated opening of the output valve 1312, causes the steam and air content of the boiler to be discharged through an optional gas mixer 1326 and then through the wand 1315. The mixer 1326 located along the steam discharge path better combines the air and steam discharged from the boiler 1301. The controller 1304 closes the output valve 1312 when the correct temperature signal is received. The temperature is measured by the temperature sensor 1321 associated with the milk jug 1318. In one example as shown in FIG. 14 the measured temperature is transmitted to the controller via a wireless communication channel that uses a wireless communication method such as WIFI, Bluetooth or RFID which allows for communication of data to the controller 1304.

In one example, user inputs from the user operated controls 1317 provide information to the controller 1304 about die desired or target temperature and/or froth texture of the finished froth product. From this input or inputs, the controller 1304 determines the optimal air flow provided to the boiler and manages the control temperature control mechanism that will result in the target temperature of the finished product.

In some embodiments, the user interface 1317 is associated with a remote accessory such as a milk frothing jug 1318 having a processor 1324 that is connected via a wireless interlace 1325 such as RFID to the controller 1304 via a wireless receiver 1325a. In some embodiments the data communication may be via a wired interface.

The communication of data and optionally power between the espresso making machine 1300 and the remote accessory 1318 is controlled by the controller 1304. A power storage device 1319 such as an internal capacitor or battery may be selectively charged when within range. The remote accessory may have its own user interface controls or inputs 1320 to define operation parameters relating to the finished froth product and sensing devices such as a temperature sensor 1321. The user adjustable input parameters may include froth amount or volume, desired temperature, starting and stopping steam flow or the like. The remote device may also allow for parameters to be displayed on the machine's display 1322 and/or the remote accessory device's own display 1323.

Details of a jug that includes a user control interface, a temperature sensor and a data communication interface are provided elsewhere herein with reference to FIG. 30 through FIG. 32.

The steam wand 1315 may be associated with a position sensor 1327 which allows for a cleaning cycle when returned to the initial upright or the borne position. The position sensor can also be used in conjunction with other parameters such as operation time, frequency of use or milk temperature to actively determine if a cleaning cycle is required. When required the controller 1304 provides a signal to the solenoid or output valve 1312 to deliver a purging dose of steam through the wand 1315 when the wand has been returned to a resting position. A dose of hot water may also be used in another embodiment for the purpose of cleaning.

In one example a pressure sensor 1310 may also be placed in communication with the steam conduit 1314 after the solenoid valve 1312. This sensor 1310 will enable the processor to display or indicate to the user an indication for when the steam wand requires cleaning or to provide an additional command, signal or voltage to the air pump for the delivery of additional air to unblock an obstruction in the steam/air delivery path, or to counteract changing, back pressure on air/steam ratio performance.

By way of example only, an apparatus for making espresso coffee can include:

a body 1300 having a steam vessel 1301 and a pressurised air source 1309 and a steam wand 1315; the steam vessel 1301 having a heating element 1302 for providing a steam source; the pressurised air source 1309 coupled to steam vessel for delivering an air supply to the steam vessel 1301; the steam wand 1315 being coupled to the steam vessel via an air-steam flow path there between for receiving an air-steam source; an output control valve 1312, located in the steam flow path, controls the steam source there through;

an electronic controller module 1304 within the body; the electronic controller module 1304 adapted to control operation of the heating element, pressurised air source and, output control valve;

a removable jug device 1318 including a processor element 1324 wirelessly couplable to the controller module 1304; the jug device 1318 including a temperature sensor element 1321 for measuring temperature of fluid within the jug; temperature sensor element 1321 being coupled to processor element for enabling the processor element to transmit a signal indicative of a measured temperature to the control module; the steam wand delivers an air-steam mixture to the fluid;

a user interface module 1317 coupled to the controller module for providing user input to the controller module; the control module receives user input of a selected temperature and selected texture; the control module, using the selected texture, determines a mixture of air and steam to specify an air-steam flow; the control module controls the pressurised air source and output control valve to deliver the specified air-steam flow during a frothing cycle; the control module receives the signal indicative of the measured temperature and closes the discharge valve when the measured temperature reaches the selected temperature to end the frothing cycle.

By way of example only, an apparatus for making espresso coffee can include;

a body 1300 having a steam vessel 1301 and a pressurised air source 1309 and a steam wand 1315; the steam vessel 1301 having a heating element 1302 for providing a steam source; the pressurised air source 1309 coupled to steam vessel for delivering an air supply to the steam vessel 1301; the steam wand 1315 being coupled to the steam vessel via an air-steam flow path there between for receiving an air-steam source; an output control valve 1312, located in the steam flow path, controls the steam source there through;

an electronic controller module 1304 within the body; the electronic controller module 1304 adapted to control operation of the heating element, pressurised air source and output control valve;

a removable jug device 1318 including a processor element 1324 wirelessly couplable to the controller module 1304; the jug device 1318 including a temperature sensor element 1321 for measuring temperature of fluid within the jug; temperature sensor element 1321 being coupled to processor element for enabling the processor element to transmit a signal indicative of a measured temperature to the control module; the steam wand delivers an air-steam mixture to the fluid;

a user interface module 1317 coupled to the controller module for providing user input to the controller module; the control module receives user input of a selected temperature and selected texture; the user interface including a variable user input for specifying the selected texture; the variable user input directly regulates the operation of an air pump 1202 that provides the pressurised air source; the variable user input provides a feedback signal to the controller for indicating the selected texture; the control module activates the pressurised air source and output control valve to deliver the specified air-steam flow during a frothing cycle; the control module receives the signal indicative of the measured temperature and closes the discharge valve when the measured temperature reaches the selected temperature to end the frothing cycle.

Milk Frothing Apparatus with Controlled Airflow

In existing automatic milk froth systems it is difficult to achieve a high quality frothed milk consistency and reliability. Cleaning is an issue with existing temperature sensor construction within the tip of the steam wand.

In an example embodiment air flow from a precisely controlled source of pressurized air can be combined with the steam path allowing adjustable frothing and texturing of milk. A steam and air mixture is output through the steam wand that is submergible in a milk jug. A heating and frothing cycle may be dependent on temperature feedback of the milk as measured by a temperature sensor (for example in the base of the jug or in the base of the frothing apparatus itself). A user can select or program profiles for different types of milk. (i.e. full fat, skim, soy, etc.). The resulting steam/air mix is then combined with milk in a jug through the submergible steam wand. Addition of air cycle stages are dependent on the feedback from, for example, a milk jug sensor.

In some embodiments, a cleaning purge cycle is selectively and/or automatically initiated. A cleaning steam pulse can be applied when the steam wand is returned to a home position (e.g. automatically using a spring loaded and dampened mechanism). Cleaning can be automated using the biased steam wand and a cleaning steam pulse. Sensor feedback of the wand position and/or previous cycle data may also be used as input data to the cleaning process (i.e. cleaning may not be required if the milk is not heated).

In an embodiment, the frothing apparatus has a source of steam, a source of pressurized air, one or more air pressure sensors associated with ports on a mixing component (i.e. a venturi, an ejector or a T-junction component), and a control module coupled to the air pressure sensor for controlling the air source such that air pressure applied to the mixing device is sufficient to provide a pressure differential. The controlled pressure differential allows for a variable airflow into the steam path.

A temperature sensor for measuring temperature of the milk in a jug (e.g. associated with base of the frothing jug) can be coupled to the control module to enable adjustments to the steam source and air source as described elsewhere herein.

In some embodiments the control module receives sensor signals that measure operating conditions, and calculates parameters for controlling the air source and/or the steam source accordingly. Controlled components such as the steam source and air pressure can be continuously adjusted throughout the steam cycle using a control logic loop.

It will be appreciated that an embodiment can, by way of example only, provide one or more of the following advantages:

providing a more precise control air injection into steam path allowing for improved milk froth quality providing automatic adjustment of air pump parameters to compensate for changes to operating conditions (i.e. steam flow, boiler pressure, air pump pulses, and wand back pressure)

providing an ability to use different control profiles based on milk type, (i.e. soy, skim milk, full fat, etc.) This can be achieved by tuning operating parameters which can affect the end result of milk type products.

enabling lower cost of configuration by using a small pump when compared to existing competing systems.

Figure 15:
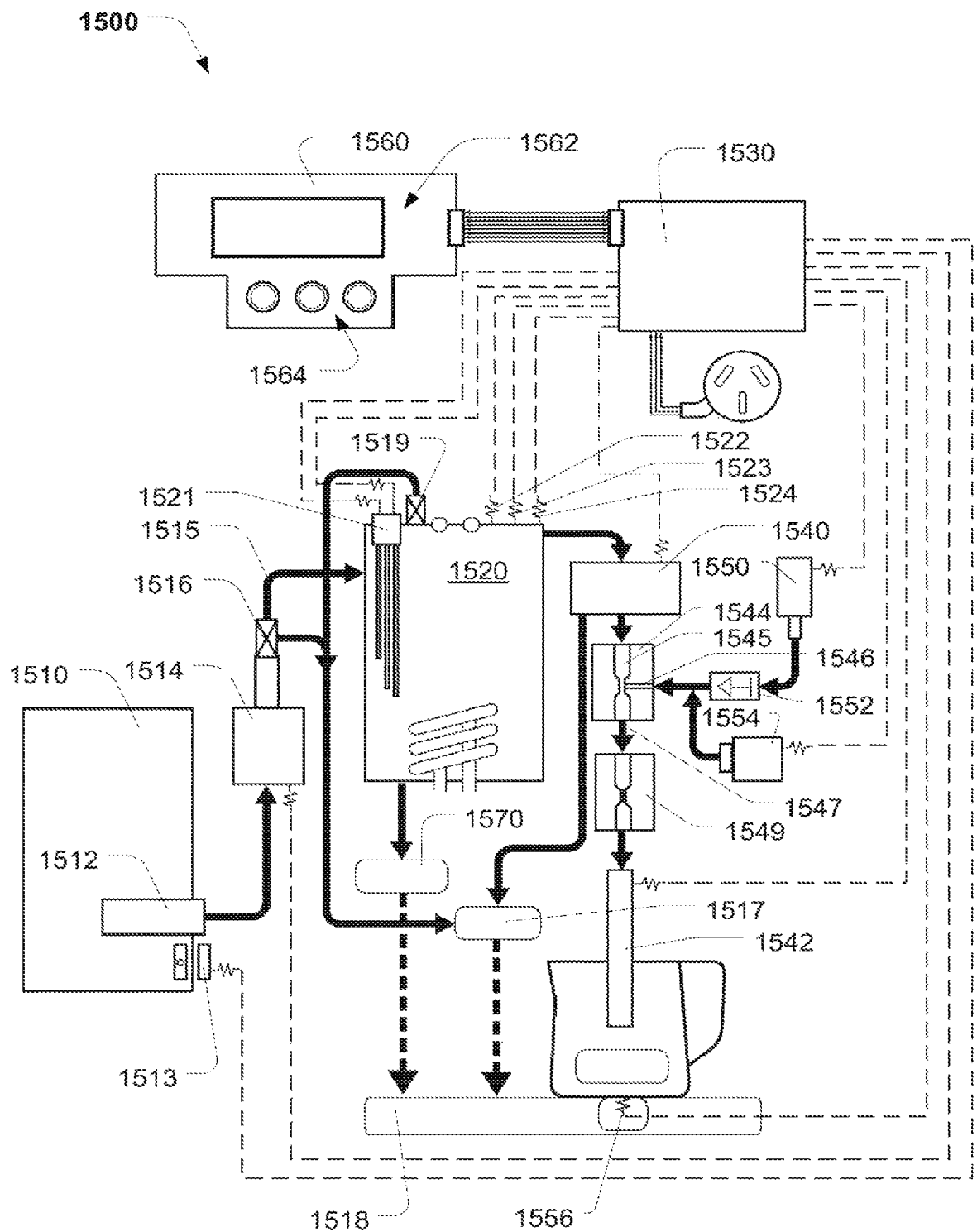
FIG. 15 is a schematic diagram of an, embodiment espresso making machine.
Figure 16:
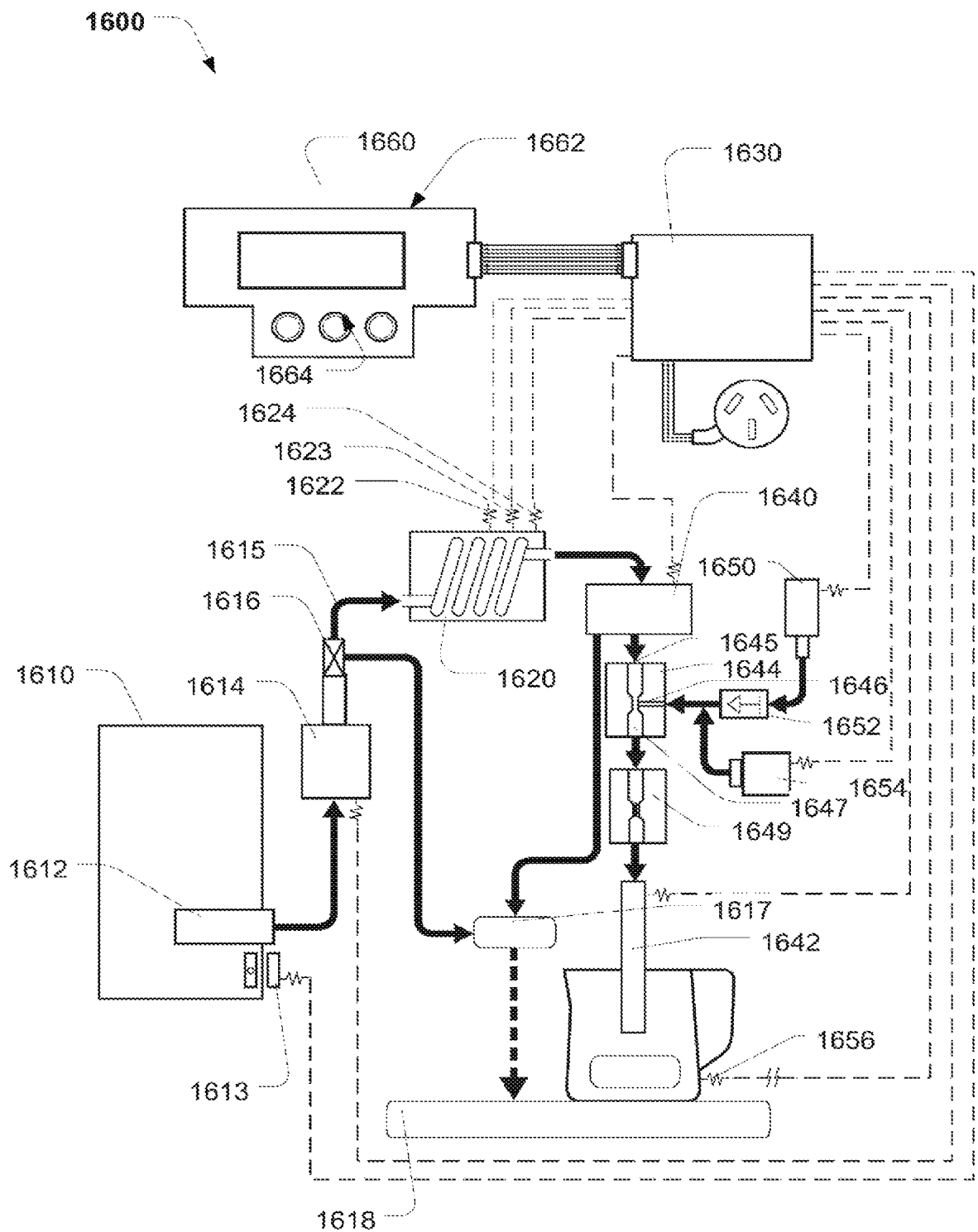
FIG. 16 is a schematic diagram of another embodiment espresso making machine.

FIG. 15 and FIG. 16 show example plumbing and control schematics for example embodiments.

Referring to FIG. 15, an example espresso making machine 1500 includes a boiler 1520, pressure transducer and milk temperature sensor (NTC) associated with base of the espresso making machine 1500.

This example embodiment apparatus 1500 includes a water source 1510 for providing water, typically through a filter cartridge 1312 which is conveyed by a pump 1514 to a boiler 1520. The flow line 1515 leading to the boiler has an overpressure value 1516 that leads to an overflow path 1517 to the drip tray 1518. The boiler also has a vacuum breather valve 1519 that is in fluid flow communication with the drip tray.

A processor module 1530 monitors operation of the boiler 1520 through a level sensor 1521 and/or a pressure sensor 1522 (for example a Piezoresistive strain gauge pressure transducer) and/or a thermal fuse 1523 and/or a thermostat 1524. The water tank 1510 can further include a water level sensor 1513, coupled to the processor module 1530, for monitoring water availability.

A solenoid 1540 controls release of steam flow to a steam wand 1542 via an air injector module 1544 and an optional static mixer 1549. The air injector module includes a primary steam flow path 1545, an air injection path 1546 and an outflow 1547. By way of example, the air injection module can incorporate a venturi. The air injection flow path 1546 can receive pressured air delivered by an air pump 1550 typically through a one way valve 1552. A pressure sensor 1554 is coupled to the air ingress flow path 1546. The pressure sensor 1554 provides pressure measurements to the processor module 1530.

It will be appreciated that with the air pump 1550 turned off (disabled), the pressure sensor can monitor a base level pressure provided by the injection module caused by the steam air flow and any back pressure provided by the steam wand. With the air pump 1550 activated to varying power levels (0%-100%) the pressure sensor monitors the pressure in the air ingress flow path, allowing for control of the pump.

It would be further appreciated that, with the air pump activated (power could be from 0%-100%), if the measured pressure is greater than the background pressure measured with the air pump off, then air will be injected into the steam flow path, then mixed and delivered to the steam wand.

A temperature sensor 1556 monitors the temperature of the milk, and provides a temperature signal to the process module 1530.

The processor module 1530 is coupled to a user interface 1560 comprising a display element 1562 and a plurality of user input elements 1564.

In an embodiment, a descale valve 1570 can enable direct flow from the boiler to the drip tray.

In some embodiments the frothing apparatus as described herein is not necessarily associated with or integral with an espresso making machine.

Referring to FIG. 16, an example frothing apparatus 1600 includes a heating element transducer system, pressure transducer and milk temperature sensor (NTC) associated with a jug. FIG. 16 shows an embodiment using a flow through steam element in place of the steam boiler of the embodiment 1500. The temperature sensor can be removable from the jug as described in more detail elsewhere herein.

The frothing apparatus 1600 includes a water source 1610 for providing water, optionally through a filter cartridge 1612, which is conveyed by a pump 1614 to a steam element 1620. The flow line 1615 leading to the steam element has an overpressure value 1616 that leads to an overflow path 1617 to the drip tray 1618.

A processor module 1630 monitors operation of the steam element 1620 through a pressure sensor (e.g. a Piezoresistive strain gauge pressure transducer), and/or a temperature sensor 1622 (for example an NTC thermistor) and/or a thermal fuse 1623 and/or a thermostat 1624. The water tank 1610 can further include a water level sensor 1613, coupled to the processor module 1630, for monitoring water availability.

A solenoid 1640 controls release of steam flow to a steam wand 1642 via an air injector module 1644 and an optional static mixer 1649. The static mixer can allow for further combining of the steam fluid, making it more homogenous. The air injector module includes a primary steam flow path 1645, an air injection path 1666 and an outflow 1647. By way of example, the air injection module can incorporate a venturi. The air injection flow path 1646 can receive pressured air delivered by an air pump 1650 typically through a one way valve 1652. A pressure sensor 1654 is coupled to the air ingress flow path 1646. The pressure sensor 1654 provides pressure measurements to the processor module 1630.

It will be appreciated that with the air pump turned off (disabled), the pressure sensor can monitor a base level pressure provided by the injection module caused by the steam air flow and any back pressure provided by the steam wand. With the air pump actuated (enabled), the pressure sensor monitors the pressure in the air ingress flow path.

It would be further appreciated that, with the air pump enabled, if the measured pressure is greater than the background pressure measured with the air pump off, then air will be injected into the steam flow path, then mixed and delivered to the steam wand.

In this example embodiment, a temperature sensor 1656, associated with the jug, monitors the temperature of the milk and provides a temperature signal to the process module 1630.

The processor module 1630 is coupled to a user interface 1660 comprising a display element 1662 and a plurality of user input elements 1664.

Figure 17:
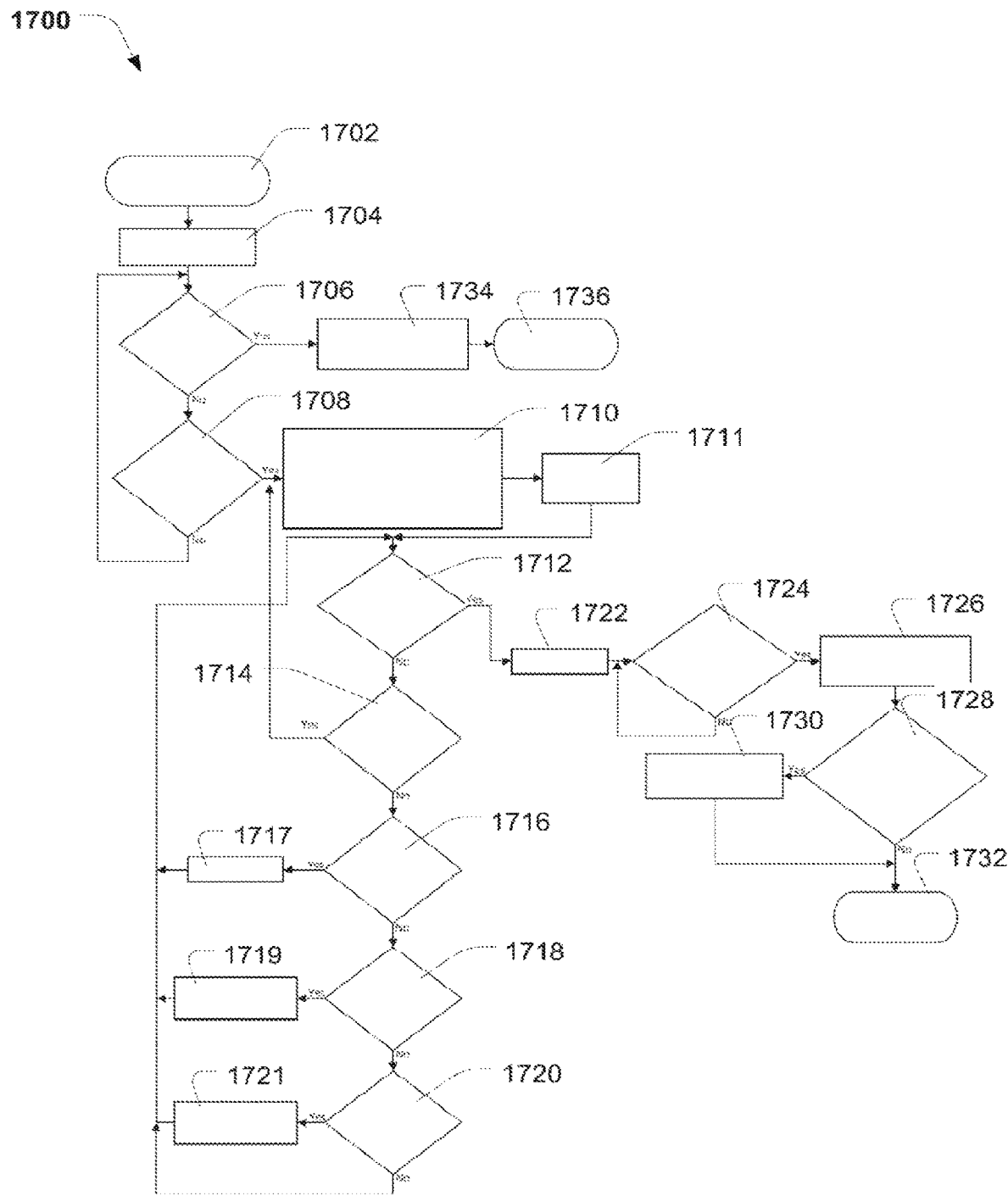
FIG. 17 is a flow chart for a method of frothing milk.

FIG. 17 shows an embodiment flow chart 1700 for a method performed by a processor module for providing and monitoring production of frothing milk.

By way of example only, the method 1700 includes any one or more of the following steps:

STEP 1702: receiving user input or activating auto froth cycle proceed to STEP 1704;

STEP 1704: activate the steam flow to the wand, present status to the user display, and proceed to STEP 1706;

STEP 1706: compare measured milk temperature with a first predetermined or threshold temperature (e.g. 60 degrees Celsius), it measured milk temperature is less than the threshold temperature then proceed to STEP 1708, otherwise proceed to STEP 1734;

STEP 1708: if a no-air timer has exceeded a first predetermined time (e.g. 2 seconds) proceed to STEP 1710, otherwise proceed to STEP 1706;

STEP 1710: disable the air pump, measure the air pressure, then calculate a pressure set point (for example the pressure set point may be calculated by combining the base-line air pressure+a user adjustable offset variable based on milk type+a rate of change of pressure calculation); proceed to STEP 1711;

STEP 1711: enable air pump (for example at or above 50%); proceed to STEP 1712;

STEP 1712: if measured milk temperature is less than a first predetermined or threshold temperature (e.g. 50 degrees Celsius) proceed to STEP 1714 otherwise proceed to STEP 1722;

STEP 1714: if the air pump timer has not exceeded a second predetermined time (e.g. 1 seconds) proceed to STEP 1710 (enabling for re-measurement of baseline pressure, and subsequent calculation of next pressure set point), otherwise proceed to STEP 1722;

STEP 1716: if measured air pressure is less than a minimum threshold (e.g. 5 psi) disable the air pump (at 1717) and proceed to STEP 1712, otherwise proceed to STEP 1718;

STEP 1718 if the measured air pressure is less than the set point increase the air pump power (at 1719) and proceed to STEP 1712, otherwise proceed to STEP 1720;

STEP 1720: if the measured air pressure is greater than the set point decrease the air pump power (at 1721) and proceed to STEP 1712, otherwise proceed to STEP 1712;

STEP 1722: disable the air pump, proceed to STEP 1724;

STEP 1724: if the milk temperature is greater than a target temperature (e.g. 60 degrees Celsius) proceed to STEP 1726, otherwise wait at STEP 1724;

STEP 1726: deactivate the steam flow, present die status to the user display, and proceed to STEP 1728;

STEP 1728: if the air pressure profile required was greater than a pre-determined maximum (blockage) threshold pressure proceed to STEP 1730 (enabling detection of operation parameters for concluding if there is a restriction in steam tip, which degrades the performance and consistency of system), otherwise proceed to STEP 1732;

STEP 1730: present status to user indicating the steam wand may be blocked and proceed to STEP 1732;

STEP 1732: proceed to complete the auto froth cycle;

STEP: 1734: disable steam flow, present status to user, and proceed to STEP 1736;

STEP 1736: proceed to complete the auto froth cycle.

It will be appreciated that in this embodiment flow chart 1700, each temperature and timer value is provided by way of example only and may be adjustable and/or calculated by a processor module and/or have different pre-determined values. As the process provides ongoing monitoring of the temperature and pressure provided by the steam wand, the user can adjust a set temperature and/or froth settings and/or milk type at any time during the cycle. The user can also stop a cycle at any point.

It would also be appreciated that during a froth cycle, the air pressure control loop may cause the air pressure set point to increase over time using a rate change calculation that provides an estimate prediction for the air pressure set point during the pump time cycle based on previous air pressure readings.

Figure 18:
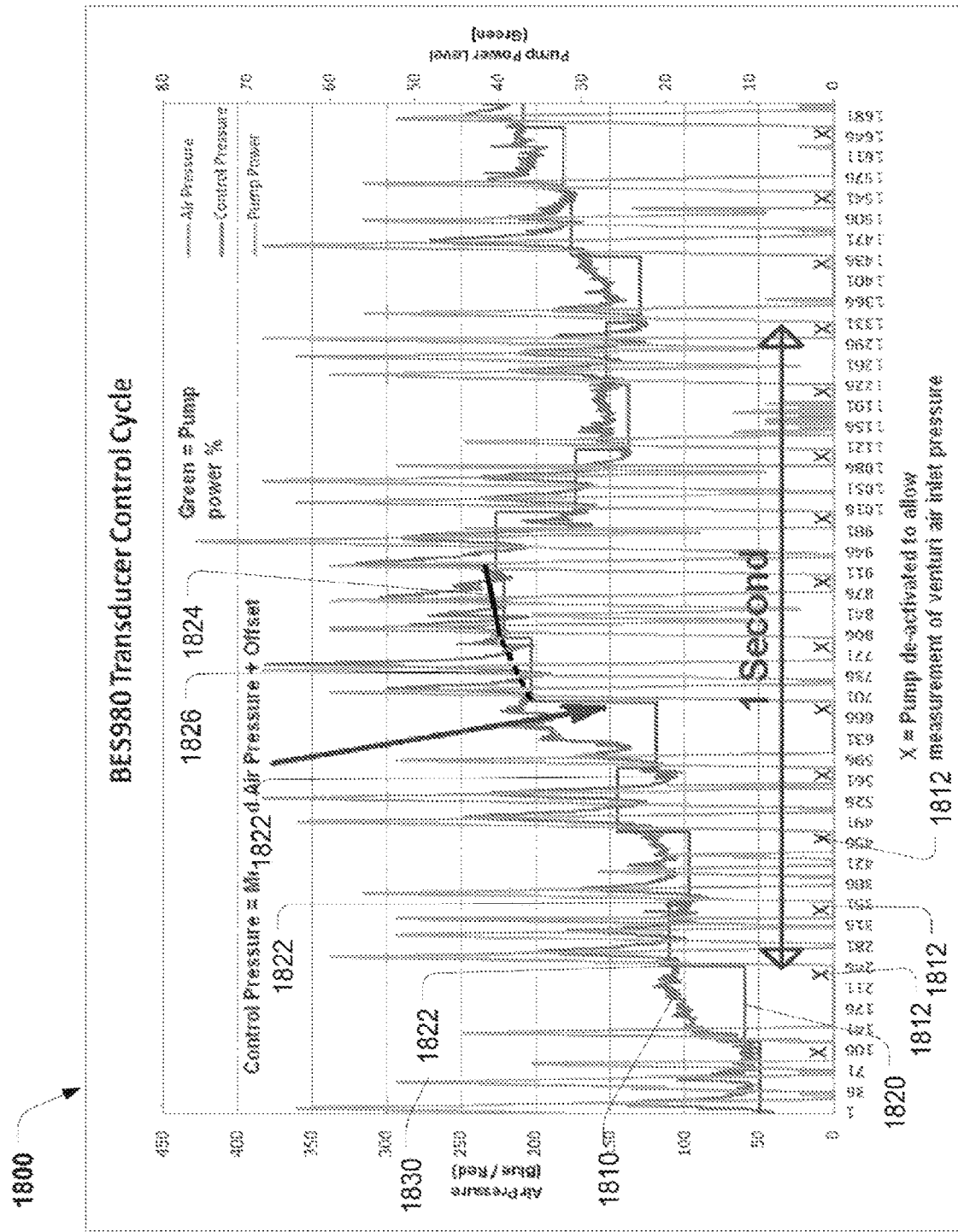
FIG. 18 is a graph depicting a transducer control cycle.

FIG. 18 is an example graph 1800 that shows pressure measurements during a portion of a froth cycle.

The graph 1800 shows a line 1810 that depicts measured air pressure, and a line 1820 that depicts a pressure controlled set point over time. This is overlaid with line 1830 that depicts the pump power over time.

It will be appreciated that the line 1820, in this example, is piece-wise linear or stepped-continuous for providing a controlled pressure set point.

In this example, the air pump is disabled periodically (for example every 0.6 seconds at 1812), to enable the pressure transducer to measure a base pressure. After measuring a base pressure, an offset is applied to provide a control pressure set point for the sample time period (at 1822), allowing the control loop to control the air pump to provide pressure measured at the pressure transducer that is about the control pressure set point.

It would be observed from the graph 1800, that the base pressure changes over time, for example due to back pressure provided by the milk during the process, the boiler pressure, and any blockages in the steam wand. By periodically monitoring the background pressure, and reapplying and/or calculating an appropriate offset pressure, the air pump can be controlled to counteract any fluctuations in background pressure and thereby provide a more reliable mix ratio between the steam flow and air flow. It would be appreciated that the graph 1800 depicts a stepwise approximation for the control pressure set point, which can be changed to a linear prediction.

In an alternative embodiment, by way of example only, the pressure control set value can also vary over time during (or within) a sample period by modelling or predicting a base pressure during that sample period (based on past samples). It will be appreciated that an interpolation (e.g. at 1824) can be made based on past samples (e.g. at 1826). Any appropriate model/interpolation technique can be employed.

By monitoring the changes in pressure, the injected air flow can be tuned for a particular milk type and froth setting, and can also enable the detection of blockages in the steam wand or flow path. Operation of the steam wand can be substantially automated or semi-automated.

FIG. 19A and FIG. 19B show an embodiment milk frother apparatus 1900, by way of example only, having a semi-automated steam wand 1910. The steam wand 1910 has a steam nozzle 1912 and a steam tip 1914.

In this embodiment, the steam wand can be raised and lowered semi-automatically. The steam wand can be raised and lowered by rotation about an axis 1920 by a drive gear 1922 acting on a driven gear 1924. The steam wand can be biased to a lowered configuration (as shown in FIG. 19A) by a torsion spring 1926. A switch 1928 is operatively associated with the wand assembly, such that it can provide a signal to a processor module 1930 indicative of the wand being in either the raised or lowered configuration.

Moving the steam wand to a raised configuration (as shown in FIG. 19B) enables the assembly to engage a releasable lock mechanism for retaining the wand in the raised configuration. In this example embodiment, the wand assembly has a detent 1940 that, when the assembly is rotated to the raised configuration, engages a biased locking pin 1942. The locking pin is defined, by way of example only, as a "pogo" pin that is biased by a compression spring.

Referring to FIG. 20A through FIG. 20F milk can be frothed by the apparatus 1900 (at 2010). The jug can then be removed (at 2020), causing it to engage the steam wand (at 2030), moving the steam wand to the raised configuration (at 2040), the wand (once in the raised configuration) can be semi-automatically lowered to a lowered configuration (at 2050), enabling a wand dean operation to commence (at 2060).

Figures 21A, 21B:
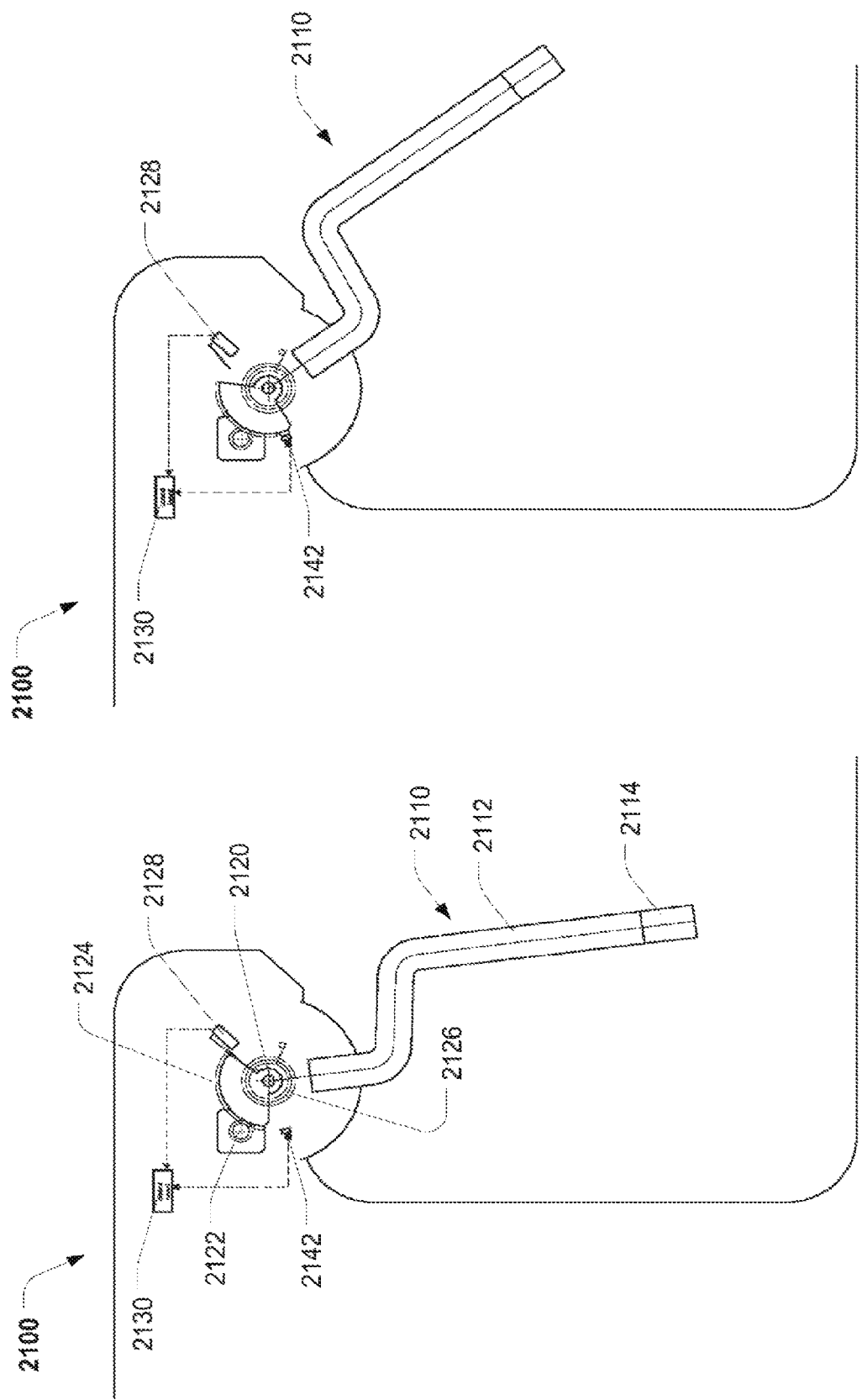
FIG. 21A and FIG. 21B show an embodiment milk frother apparatus.

Referring to FIG. 21A and FIG. 21B, this process can be further automated by monitoring the state of the steam wand in the raised configuration. By way of example only, the locking mechanism, can provide a signal to the processor module for confirming the wand is currently in the raised configuration.

FIG. 21A and FIG. 21B show an embodiment milk frother apparatus 2100, by way of example only, having an automated steam wand 2110. The steam wand 2110 has a steam nozzle 2112 and a steam tip 2114.

In this embodiment, the steam wand can be raised and lowered automatically. The steam wand can be raised and lowered by rotation about an axis 2120 by a motorised drive gear 2222 acting on a driven gear 2224. The steam wand can be biased to a lowered configuration (as shown in FIG. 21A) by a torsion spring 2126. A switch 2128 is operatively associated with the wand assembly, such that it can provide a signal to a processor module 2130 indicative of the wand being in either the raised or lowered configuration.

Moving the steam wand to a raised configuration (as shown in FIG. 21B) enables a sensor 1242 to detect the assembly being in the raised configuration. In this example embodiment, the sensor is coupled to the processor module for providing a signal indicative of the wand assembly being in the raised configuration.

Referring to FIG. 22A through FIG. 22F, milk can be frothed by the apparatus 2100 (at 2210). The jug can then be removed (at 2220), causing the steam wand to raise (at 2230), the steam wand is moved to the raised configuration (at 2240), the wand (once in the raised configuration) can be automatically lowered to a lowered configuration (at 2250), enabling a wand clean operation to commence (at 2260).

Figure 23:
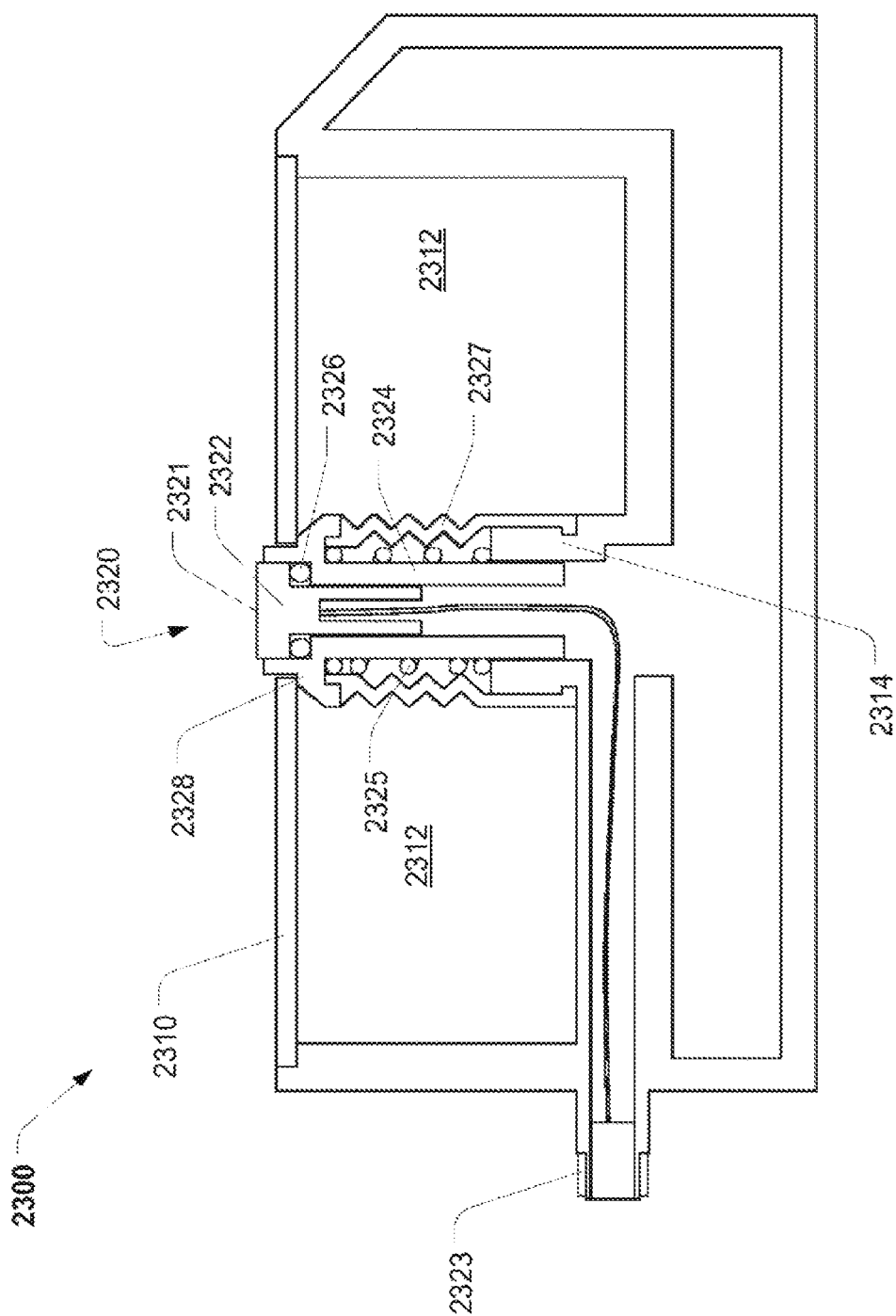
FIG. 23 shows an example embodiment drip tray having an inbuilt temperature sensor.

FIG. 23 shows an example embodiment drip tray 2300 having an, inbuilt temperature sensor.

In this example embodiment, the drip tray provides a support surface 2310 for receiving a jug during a milk froth operation. A temperature sensing assembly 2320 is biased to an exposed configuration, such that a temperature sensing surface 2321 protrudes though (and is above) the support surface 2310 for enabling the sensor to engage and thermally couple with a supported jug. Placing a jug on the temperature sensor causes it to lower against a bias such that thermal coupling is maintained.

In this embodiment, the temperature sensor assembly 2320 includes a negative temperature coefficient (NTC) sensor 2322 that is electrically coupled to a socket portion 2323. The drip tray defines a reservoir portion 2312 about the temperature sensing assembly 2320. The temperature sensing assembly 2320 has a chassis 2324 that slidably engages through a floor potion 2314 of the reservoir, and is biased into a raised configuration by a compression spring 2325. An O-ring seal 2326 and flexible cover 2327 are provided to seal the temperature sensing assembly 2320 from the reservoir 2312. The temperature sensing assembly 2320 can include an abutment surface 2328 that engages the drip tray support surface 2310 for limiting the height of the temperature sensing surface 2321 when in the raised configuration. The support surface 2310 is typically provided in the form of a perforated platform that is removable for cleaning. It will be appreciated that the drip tray provides a reservoir 2312 about the temperature sensing assembly 2320.

Figure 24:
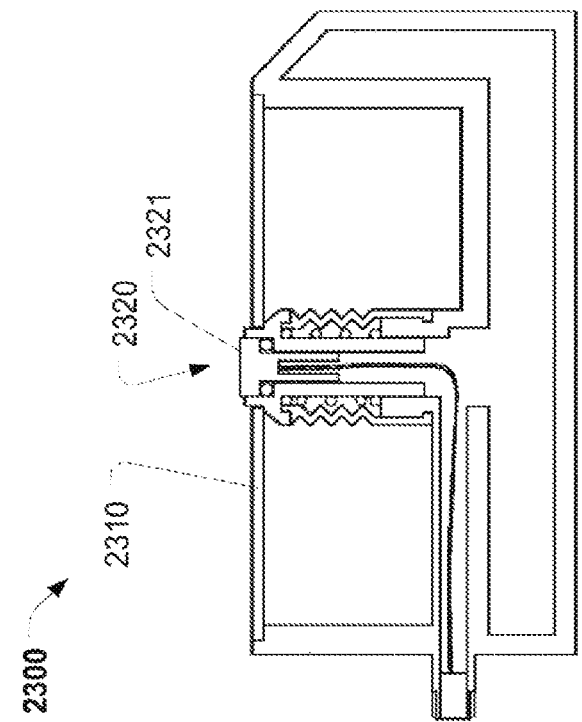
FIG. 24 shows the drip tray of 23, having the temperature sensing apparatus in a raised configuration.
Figure 25:
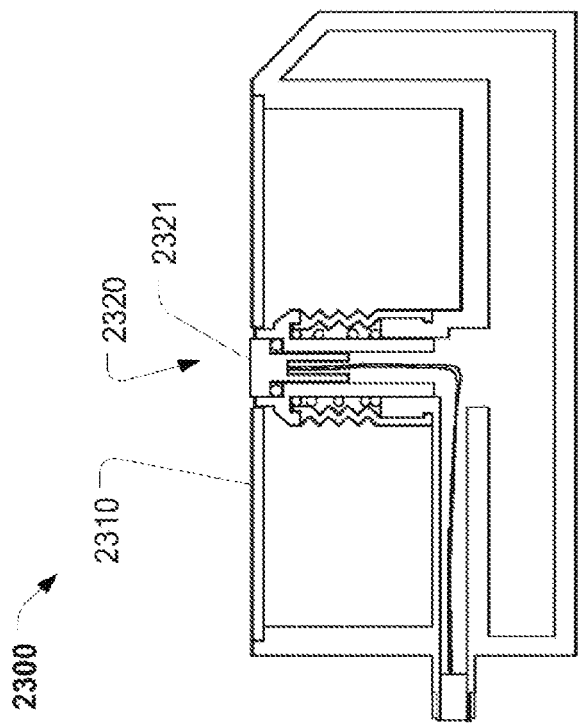
FIG. 25 shows the drip tray of FIG. 23, having the temperature sensing apparatus in a lowered configuration (biased upwards)

FIG. 24 shows the drip tray 2300, having the temperature sensing assembly 2320 in a raised configuration. FIG. 25 shows the drip tray 2300, having the temperature sensing assembly 2320 in a lowered configuration (biased upwards).

Figure 26A:
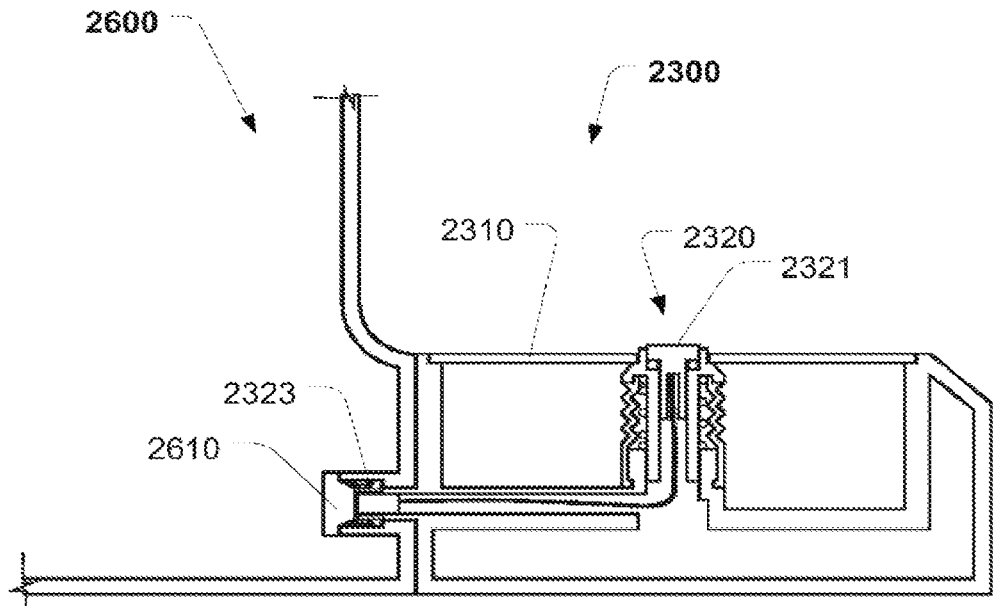
FIG. 26A and FIG. 26B show an embodiment coffee making and/or milk frothing apparatus, having a removable drip tray.
Figure 26B:
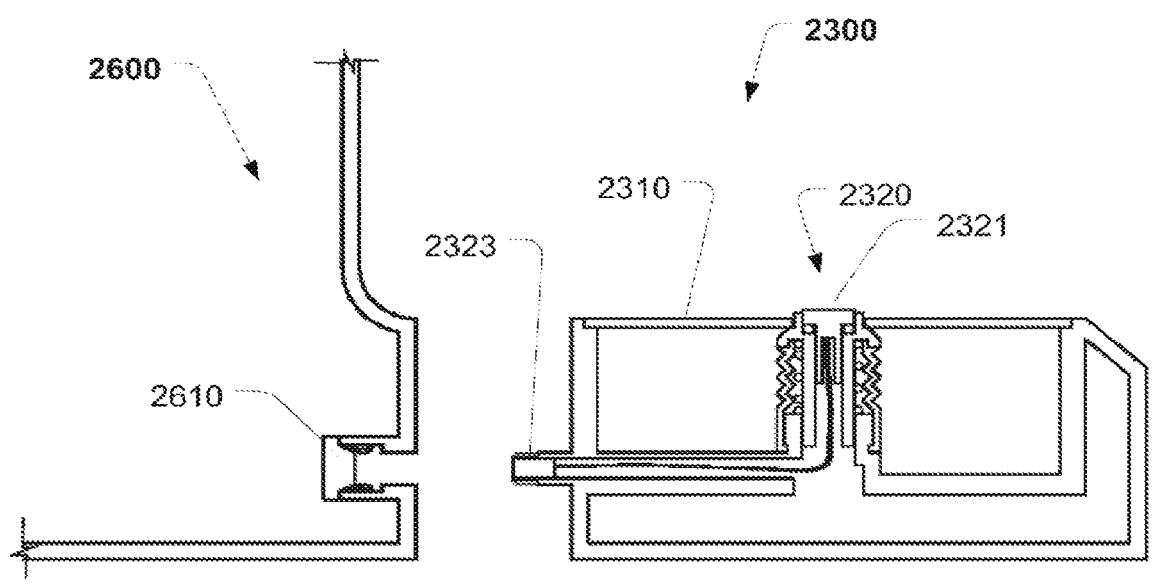

FIG. 26A and FIG. 26B show the drip tray 2300 can be removably coupled to a coffee making and/or milk frothing apparatus 2600. It will be appreciated that the drip tray apparatus 2300 is typically removed for cleaning. Electrical contacts 2610 engage the coupling 2323 when the device is engaged with the apparatus 2600, for enabling a processor module to monitor temperature.

Figure 27A:
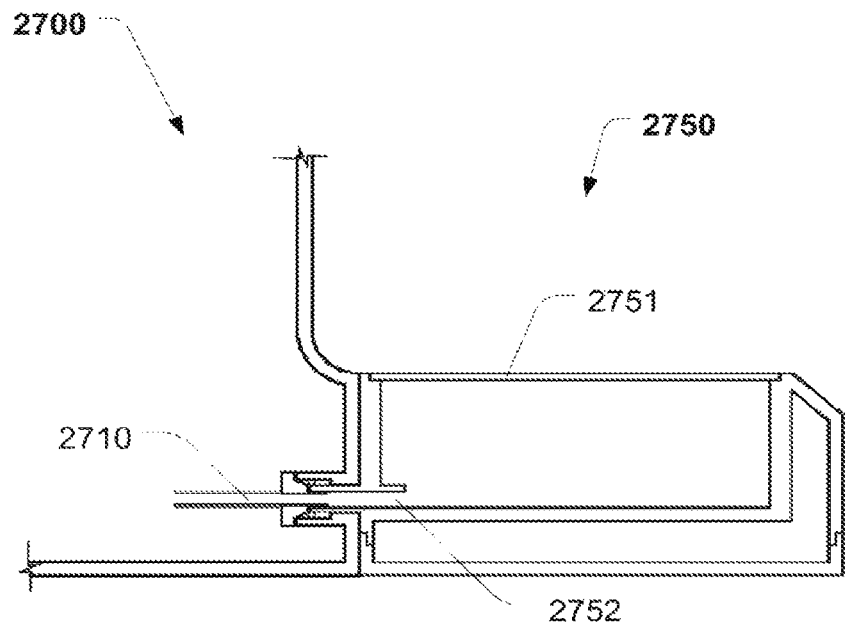
FIG. 27A and FIG. 27B show an embodiment coffee making and/or milk frothing apparatus, having a removable drip tray.
Figure 27B:
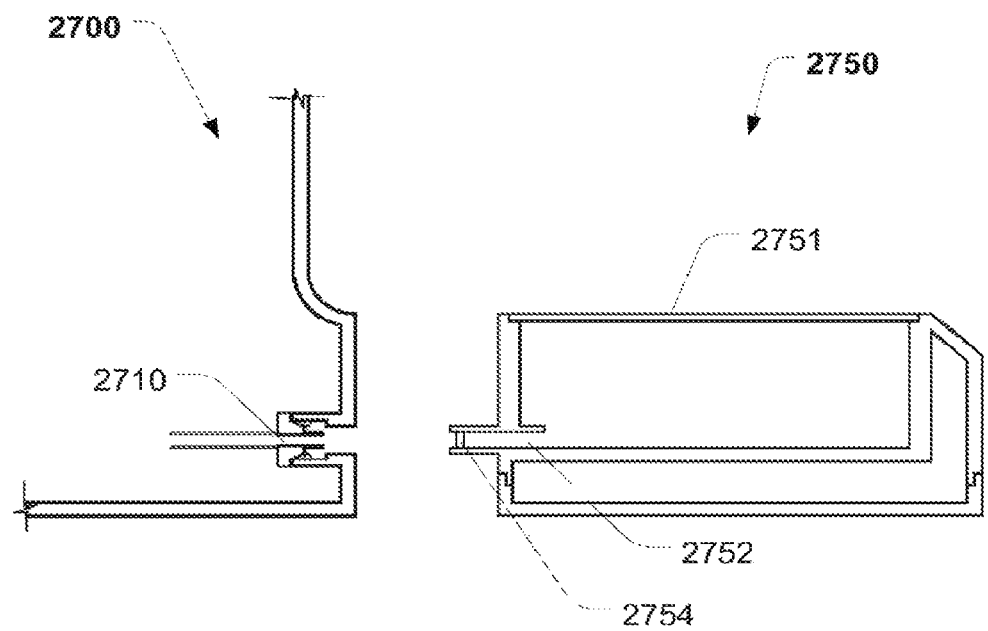

FIG. 27A and FIG. 27B show an embodiment coffee making and/or milk frothing apparatus 2700 releasably engagable with a drip tray 2750 that enables waste water/steam ingress to the drip tray.

It will be appreciated that, when a drip tray is coupled to an apparatus that requires waste water to egress from the apparatus to the drip tray, the drip tray can be further configured with a separate, ingress port typically associated with or located about the coupling.

FIG. 27A shows a coffee making apparatus or milk frothing apparatus 2700 laving a steam/waste water egress 2710 that engages the drip tray 2750 in fluid communication with an ingress port 2752. This fluid flow coupling can be made with or without electrical coupling for a temperature sensor.

Referring to FIG. 27B, a one way valve 2754 can be provided to restrict water held in the drip tray from spilling as the drip tray is removed from the apparatus. The one way valve can be automatically opened as the drip tray is coupled to the apparatus, and automatically closed as the drip tray is removed or separated from the apparatus. Fluid sealing of the coupling can be provided (for example using an O-ring or other sealing means).

Figure 28:
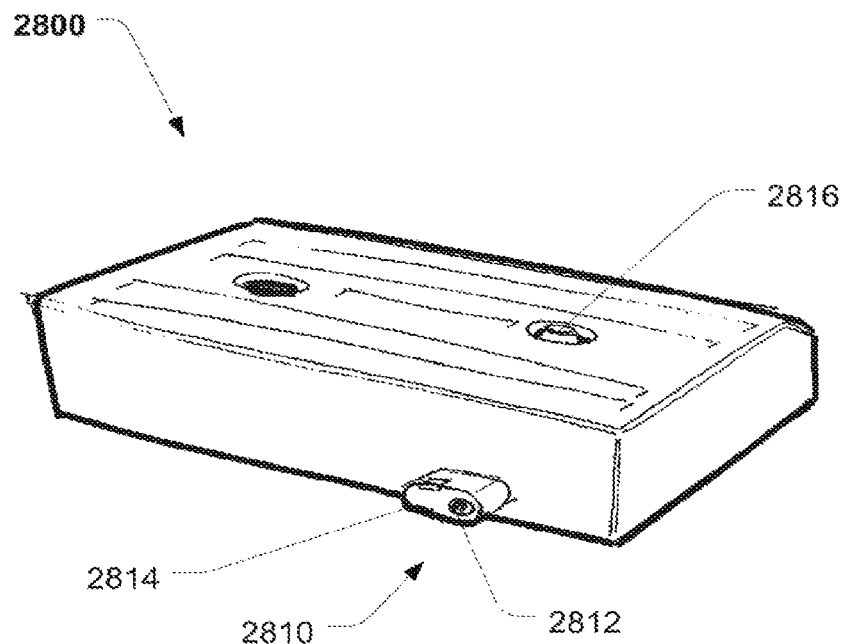
FIG. 28 shows an embodiment removable drip tray having a coupling element comprising an electrical coupling and waste water/steam coupling.
Figure 29:
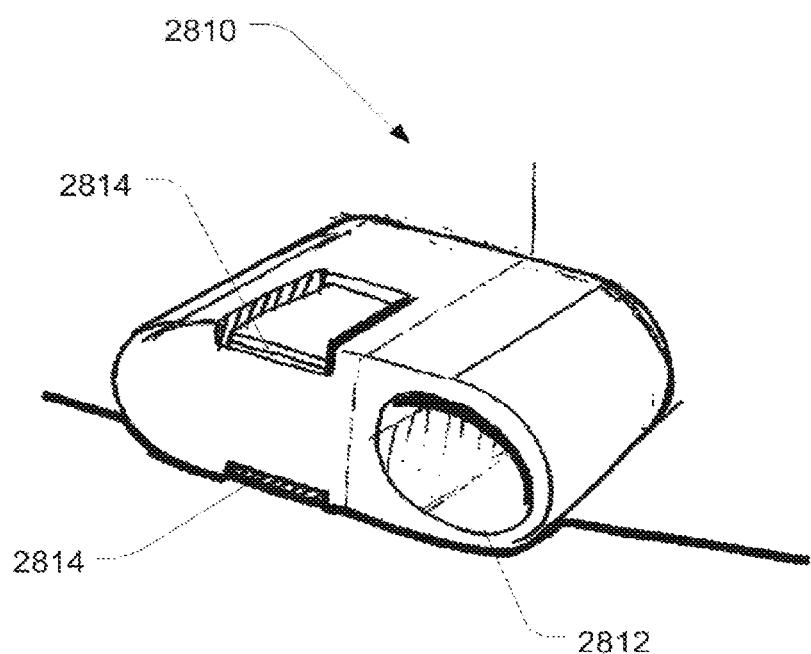
FIG. 29 shows an enlarged view of the coupling element of the drip tray of FIG. 28.

FIG. 28 shows an example embodiment drip tray 2800 that includes a coupling element 2810. This coupling element, by way of example only, includes an ingress flow path 2812 for receiving waste water/steam and an electrical coupling 2814 for communicating a temperature signal from a temperature sensor 2816. FIG. 29 shows an enlarged view of the coupling element 2810.

FIG. 30A through FIG. 32B show an embodiment jug 3000 for frothing milk. It will be appreciated that this jug can be used with apparatus disclosed herein.

In this example embodiment, the jug 3000 includes a body (or vessel) 3010 having a removable attachable handle 3020. It will be appreciated that the handle 3020 can be removed to allow the body 3010 to be separately cleaned or washed.

The body 3010 and handle 3020 have respective coupling elements (for example, 3030A-3030B and 3032A-3032B) for releasably coupling the handle 3020 to the jug 3000. In an example embodiment a release mechanism such as a button 3034 is associated with a coupling element (for example, coupling element 3032B) for releasing coupling to a respective coupling element on the jug (for example coupling element 3032A).

Figures 31A, 31B:
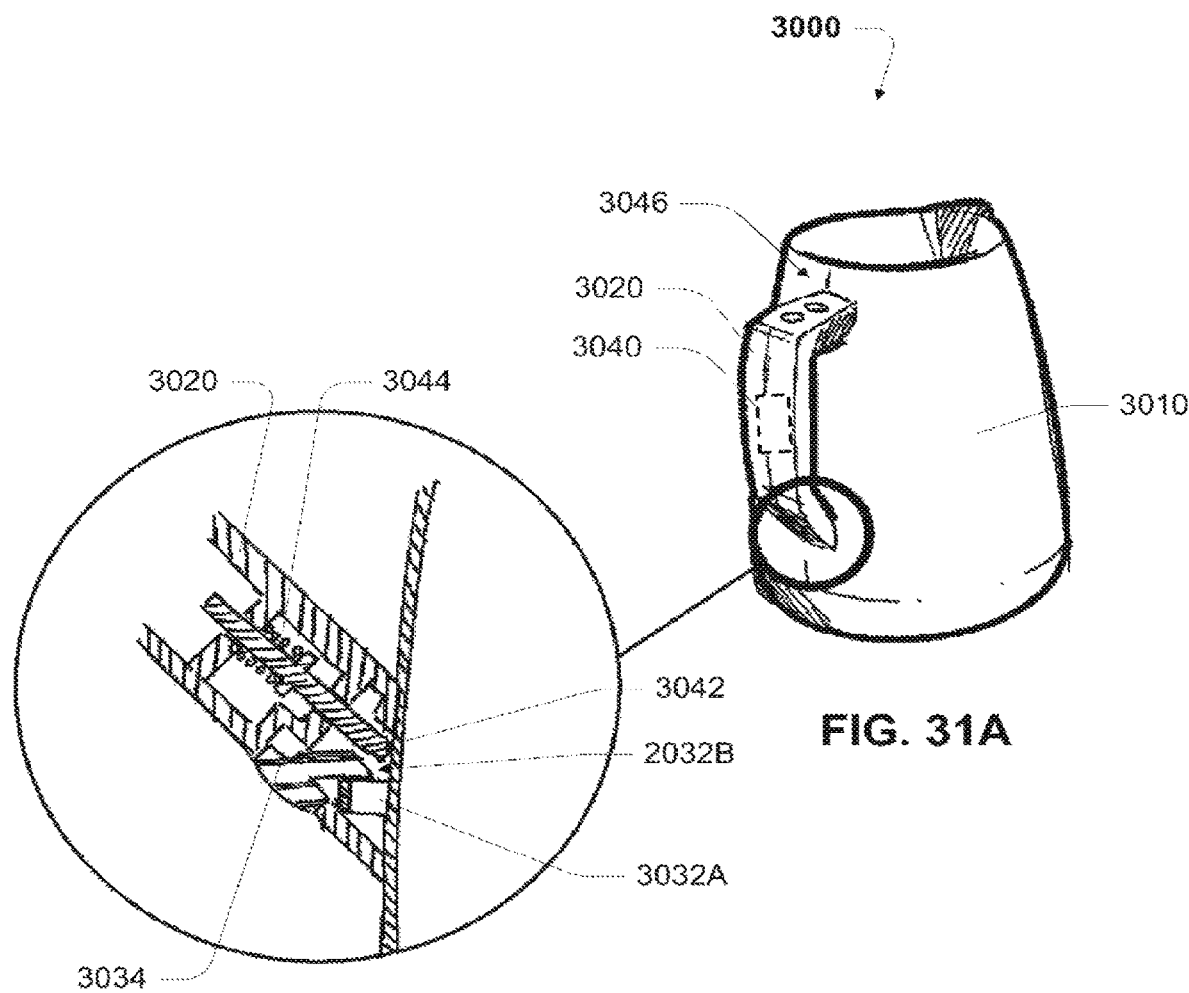
FIG. 31A shows an embodiment jug for frothing milk, shown with an attached handle.
FIG. 31B shows an enlarged partial cross section view of the embodiment jug of FIG. 31A.

The handle 3020 further includes a controller element 3040 for communicating data (or data signals) to a cooperating frothing apparatus (not shown). The data communication can be via wired or wireless communication. In this embodiment, the controller element is coupled to a temperature sensor 3042 for monitoring the temperature of liquid in the vessel. As shown here, the temperature sensor is supported by the handle, and comes into thermal coupling with the jug when the handle is attached. The temperature sensor 3042 is biased toward the jug 3000 for enhancing thermal coupling with the jug when the handle 3020 is attached. For example, the temperature sensor 3042 is biased by a spring 3044 (or other biasing means) into the thermal coupling with the jug, as best shown in FIG. 31B.

The handle 3020 can further include one or more user interface input elements (for example, function selection buttons or switches) 3046 that are coupled to the controller element 3040. As shown, the user interface includes two toggle buttons, for toggling through temperature and froth settings. It will be appreciated that any number of user interface controls may be used for this type of application, for example a sliding control.

User selection of the input elements can be monitored and/or used by the controller element 3040 for controlling features of the jug 3000. User selection of the input elements may be transmitted to a controller module in the frothing apparatus for providing user input to the apparatus.

It would be appreciated that an embodiment handle may also include a display element (not shown).

In some embodiments communication between the controller element 3040 and associated frothing apparatus is one-directional, and data pertaining to the user settings entered via the input elements 3046 is communicated to the frothing apparatus and used to control the frothing process.

In other embodiments communication is bi-directional for the purpose of communication management (e.g. sending data receipt acknowledgements and/or resending data in the event of a transmission error), and/or for the purpose of providing data from the frothing apparatus controller back to the jug (e.g. operation status information that is displayed on a handle display or conveyed via the user interface in the form of coloured LED lights).

As shown in FIG. 32B, an embodiment handle 3020 includes a plurality of coupling elements (for example, 3030B and 3032B) that couple to respective coupling elements on the jug 3000 (for example 3030A and 3032A).

It would be appreciated that a controller element 3040 can also be associated with one or more additional/alternative sensors (not shown) for monitoring operation of the jug.

As described with reference to 14, the power required by the electronics on the handle 3020 can be provided by a wired or wireless connection from the cooperation apparatus or machine (i.e. a standalone frother apparatus or an espresso making machine). For the embodiment shown here, the handle 3020 includes a power storage (not shown) that is charged via a wireless connection with a milk frother adapted to receive the jug 3000 and adapted to charge the jug handle power storage. In some embodiments data regarding depleted power is indicated on the handle user interface and/or communicated to the cooperating apparatus or machine and, where appropriate, used as an input to a recharging process.

It with be appreciated, by way of example only, that a jug may be used with a frothing apparatus. The jug comprising:
- a vessel body for holding a liquid to be heated;
- a handle attached to the vessel body, the handle for holding the jug;
- a user interface for receiving an operation-related user input;
- a communication means adapted to communicate data associated with the jug to the frothing apparatus; and
- a controller for controlling the user interface and the communication means.

It will be further appreciated, by way of example only, that a frothing apparatus can be adapted to cooperate with a jug for heating a liquid in the jug. The frothing apparatus comprising:
- a steam heater, a steam nozzle, and a steam path providing fluid communication from the steam heater to the steam nozzle for delivering heating steam to the jug;
- communication means adapted to receive operating data from a cooperating communication means associated with the jug, the data comprising an operation-related user input; and
- a controller for controlling operation of the steam heater and the steam path based on the operation-related user input.

It will be further appreciated, by way of example only, that an espresso making machine can comprising a frothing apparatus as taught by any one the embodiments suggested herein. The frothing apparatus can be further adapted to cooperate with (or include) a jug as taught by any one the embodiments suggested herein.

Interpretation

It will be appreciated that the illustrated embodiments provide an apparatus for milk frothing.

Although the invention has been described with reference to specific examples, it will be appreciated by those skilled hi the art that the invention may be embodied in many other forms.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems Wherein an output of device A is directly connected to an input of device B. It means that there exists a path between an output of A and an input of B which may be a path including other devices or means. "Coupled" may mean that two or more elements are either in direct physical, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

As used herein, unless otherwise specified the use of terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader, or with reference to the orientation of the structure during nominal use, as appropriate. Similarly, the terms "inwardly" and "outwardly" generally refer to the orientation of a surface relative to its axis of elongation, or axis of rotation, as appropriate.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some hut not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The invention claimed is:

1. A method of performing a frothing cycle for milk in a frothing apparatus container by injecting steam mixed with air provided by an air pump into the milk in the container, the method comprising the steps of:
   1a) disabling the air pump;
   1b) determining a back pressure of a wand having a distal end that is submersible in milk in the container, the back pressure being measured in an air ingress flow path from the air pump prior to mixing with steam;
   1c) determining a pressure set point, dependent upon the determined back pressure and a desired pressure profile, to be established by the air pump; and
   1d) enabling the air pump at a pump power dependent upon the determined pressure set point.

2. The method according to claim 1, further comprising, prior to determining the wand back pressure, the steps of:
   2a) receiving a frothing cycle command; and
   2b) activating a flow of steam to the wand.

3. The method according to claim 1, further comprising, prior to determining the wand back pressure, the step of:
   determining if a temperature of the milk in the container is less than a predetermined temperature.

4. The method according to claim 2, further comprising, after the step (2b) and prior to the step (1b), the steps of:
   4a) determining if the temperature of the milk in the container exceeds the predetermined temperature; and
   if the temperature of the milk in the container exceeds the predetermined temperature, the steps of:
      4aa) disabling the flow of steam;
      4ab) presenting status information; and
      4ac) concluding the frothing cycle for the milk in the container.

5. The method according to claim 3, wherein the steps (1b), (1c), and (1d) are performed only if the air pump has been disabled for more than a first time-period.

6. The method according to claim 1, further comprising, after the step (1d), the steps of:
   if the temperature of the milk in the container is less than the predetermined temperature, periodically performing the steps (1a), (1b), (1c), and (1d).

7. The method according to claim 6, further comprising, if the temperature of the milk in the container is less than the predetermined temperature, periodically performing the steps of:
   7a) if the wand back pressure is less than a minimum threshold, disabling the air pump;
   7b) if the wand back pressure is greater than the minimum threshold and is less than the pressure set point, increasing the air pump power; and
   7c) if the wand back pressure is greater than both the minimum threshold and the pressure set point, decreasing the air pump power.

8. The method according to claim 6, further comprising, if the temperature of the milk in the container is greater than the predetermined temperature, the steps of:
   8a) disabling the air pump;
   8b) if the temperature of the milk in the container is greater than a target temperature, the steps of:
      8ba) disabling the flow of steam; and
      8bb) presenting status information; and
   8c) if the wand back pressure is greater than a blockage threshold, the steps of:
      8ca) presenting blockage status information; and
      8cb) concluding the frothing cycle for the milk in the container.

9. An apparatus for performing a frothing cycle for milk in a frothing apparatus container by injecting steam mixed with air provided by an air pump into the milk in the container, the apparatus comprising:
   a steam source for providing a flow of steam to a steam wand having a distal end that is submersible in the milk in the container;
   the steam wand;
   a temperature sensor for measuring a temperature of the milk in the container;
   the air pump for providing a flow of air to the steam wand;
   a pressure sensor for measuring back pressure of air in the steam wand; and
   a processor configured to:
      determine a back pressure of the wand, the back pressure being measured in an air ingress flow path from the air pump prior to mixing with steam;
      determine a pressure set point, dependent upon the determined back pressure and a desired pressure profile, to be established by the air pump; and
      enable the air pump at a pump power dependent upon the determined pressure set point.

10. The apparatus according to claim 9, wherein the processor is further configured to:
    receive a frothing cycle command; and
    activate a flow of steam to the wand.

11. The apparatus according to claim 9, wherein the processor is further configured to:
    determine if a temperature of the milk in the container is less than a predetermined temperature; and
    disable the air pump if the temperature of the milk in the container is less than the predetermined temperature.

12. The apparatus according to claim 9, wherein the steam source is a boiler.

13. The apparatus according to claim 9, wherein the steam source is a flow through steam element.

14. A non-transitory computer-readable medium storing instructions for a processor of an apparatus for performing a frothing cycle for milk in a frothing apparatus container by injecting steam mixed with air provided by an air pump into the milk in the container that, when executed by the processor, cause the processor to:

disable the air pump;

determine a back pressure of a wand having a distal end that is submersible in the milk in the container, the back pressure being measured in an air ingress flow path from the air pump prior to mixing with steam;

determine a pressure set point, dependent upon the determined back pressure and a desired pressure profile, to be established by the air pump; and enable the air pump at a pump power dependent upon the determined pressure set point.

15. The non-transitory computer-readable medium according to claim 14, wherein execution of the instructions further causes the processor, prior to determining the wand back pressure, to:

receive a frothing cycle command; and activate a flow of steam to the wand.

16. The non-transitory computer-readable medium according to claim 15, wherein execution of the instructions further causes the processor, prior to determining the wand back pressure, to:

disable the air pump if a temperature of the milk in the container is less than a predetermined temperature.

\* \* \* \* \*

UNITED STATES PATENT AND TRADEMARK OFFICE
CERTIFICATE OF CORRECTION

PATENT NO. : 11,751,717 B2
APPLICATION NO. : 16/739043
DATED : September 12, 2023
INVENTOR(S) : Robert Grassia et al.

It is certified that error appears in the above-identified patent and that said Letters Patent is hereby corrected as shown below:

In the Specification

Column 5, Line 13, "with t jug" should be --with a jug--.

Column 6, Line 61, "with detached" should be --with a detached--.

Column 8, Line 7, "303" should be --301--.

Column 9, Line 24, "in, 011 or" should be --in, on, or--.

Column 10, Line 2, "lip" should be --tip--.

Column 10, Line 24, "hall" should be --ball--.

Column 10, Line 29, "2006" should be --1006--.

Column 10, Line 53, "not" should be --1101--.

Column 11, Line 30, "tilt" should be --1111--.

Column 13, Line 1, "b" should be --by--.

Column 13, Line 42, "die" should be --the--.

Column 13, Line 51, "interlace" should be --interface--.

Column 14, Line 7, "borne" should be --home--.

Column 16, Line 20, "control air" should be --control of air--.

Signed and Sealed this
Fifth Day of March, 2024

Katherine Kelly Vidal
*Director of the United States Patent and Trademark Office*

CERTIFICATE OF CORRECTION (continued)
U.S. Pat. No. 11,751,717 B2

Column 16, Line 40, "1323" should be --1512--.

Column 18, Line 13, "or" should be --for--.

Column 18, Line 20, "it" should be --if--.

Column 18, Line 59, "die" should be --the--.

Column 21, Line 45, "laving" should be --having--.

Column 23, Line 44, "hi" should be --in--.

Column 24, Line 54, "hut" should be --but--.